US012778069B2

(12) United States Patent
Lavi

(10) Patent No.: US 12,778,069 B2
(45) Date of Patent: Nov. 3, 2026

(54) LITTER BOX

(71) Applicant: Amir Lavi, Tel Aviv (IL)

(72) Inventor: Amir Lavi, Tel Aviv (IL)

( * ) Notice: Subject to any disclaimer, the term of this patent is extended or adjusted under 35 U.S.C. 154(b) by 0 days.

(21) Appl. No.: 19/190,383

(22) Filed: Apr. 25, 2025

(65) Prior Publication Data

US 2025/0248361 A1 Aug. 7, 2025

Related U.S. Application Data

(63) Continuation-in-part of application No. 16/953,325, filed on Nov. 19, 2020, now abandoned.

(51) Int. Cl.
*A01K 1/01* (2006.01)

(52) U.S. Cl.
CPC ............ *A01K 1/011* (2013.01); *A01K 1/0114* (2013.01)

(58) Field of Classification Search
CPC ..... A01K 1/0107; A01K 1/011; A01K 1/0114
See application file for complete search history.

(56) References Cited

U.S. PATENT DOCUMENTS 4,649,578 A * 3/1987 Vargo ................... A01K 1/0107 4/449
5,699,754 A * 12/1997 Cahajla ................ A01K 1/0114 119/165
6,408,790 B1 * 6/2002 Maguire .............. A01K 1/0114 119/165
9,737,045 B1 * 8/2017 Scanlan ................. A01K 1/011
2006/0037548 A1 * 2/2006 Mohr ................... A01K 1/0107 119/166
2007/0068461 A1 * 3/2007 Hill ...................... A01K 1/0114 119/166
2018/0220619 A1 * 8/2018 Takagi ................. A01K 1/0114
2019/0191662 A1 * 6/2019 Takada ................. A01K 1/0103
2021/0037781 A1 * 2/2021 Klatt .................... A01K 1/0114

FOREIGN PATENT DOCUMENTS

KR 20200121136 A * 10/2020 ............. A01K 1/011
KR 20220022992 A * 3/2022 ............. A01K 1/011

* cited by examiner

*Primary Examiner* — Magdalena Topolski
*Assistant Examiner* — Alanna K Peterson
(74) *Attorney, Agent, or Firm* — Christopher Pilling

(57) ABSTRACT

An improved litter box is provided. It features a hollow base container configured to retain liquid waste in its hollow volume. Under normal conditions it can hold approximately 30 days of daily liquid waste. A sloped transportation member is positioned on top of the base container, wherein the sloped transportation member is configured to direct liquid waste to the hollow base container through a drain hole. A segment housing member is positioned on top of the sloped transportation member, wherein the segment housing member includes a plurality of segment units, each segment unit of the plurality of segment units having a segment member, wherein the segment member's position in the segment unit provides a space, the space allowing liquid waste to pass through the segment housing member and enter the sloped transportation member. A plurality of litter sand particles positioned in the plurality of segment units are provided enabling a surface of domesticated cats and animals to defecate.

10 Claims, 30 Drawing Sheets

LITTER BOX

CROSS-REFERENCE TO RELATED APPLICATIONS

The present invention is a continuation in part application to U.S. utility patent application Ser. No. 16/953,325 filed Nov. 19, 2020.

BACKGROUND OF THE INVENTION

1. Field of the Invention

The present invention relates generally to litter boxes, and more particularly an improved litter box providing inventive features for improved drainage.

2. Description of Related Art

It is common to keep domesticated cats almost exclusively indoors. Thus cats are easily trained to relieve themselves in a given location, such as a litter box filled with an absorbent, granular material or "litter." A conventional cat litter box receives litter into which a cat evacuates liquid and solid excrement, the litter functioning to absorb moisture and form clumps for removal. However, the lack of drainage for liquid excrement causes unnecessary litter waste, lack of longevity, and increases odors. Consequently, a solution is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, an improved litter box is provided, comprising a hollow base container configured to retain liquid waste; a sloped transportation member positioned on top of the base container, wherein the sloped transportation member is configured to direct liquid waste to the hollow base container; a segment housing member positioned on top of the sloped transportation member, wherein the segment housing member comprises a plurality of segment units, each segment unit of the plurality of segment units having a segment member, wherein the segment member's position in the segment unit provides a space, the space allowing liquid waste to pass through the segment housing member and enter the sloped transportation member; and, a plurality of litter sand particles positioned in the plurality of segment units.

In one embodiment, the hollow base container comprises an opening on a top surface and the sloped transportation member includes a drain hole, wherein the drain hole and opening are vertically aligned. In one embodiment, the sloped transportation member includes a number of sloped or angled surfaces configured to direct liquid waste to one or more drain holes. In another embodiment, the hollow base container, the sloped transportation member, and the segment housing member are rectangular. In yet another embodiment, each segment member is of a spherical shape, wherein the spherical shape provides a sloped surface to direct the liquid waste to the space. In one embodiment, each segment member is of a rectangular shape, wherein the space is the space between each segment member. In one embodiment, the segment housing member and the sloped transportation member are a single integral unit. In another embodiment, the base container and the sloped transportation member are a single integral unit. It should be understood that any layer described herein may be integral or separate. In another embodiment, the hollow base container comprises an absorbent material pad configured to absorb liquid waste. In another embodiment, a one-way valve enabling liquid waste to enter the hollow base container while preventing odor from escaping is provided. In yet another embodiment, the hollow base container has an internal volume of at least 24 liters. In one embodiment, the hollow base container comprises a handle enabling a user to maneuver the hollow base container for maintenance and draining of the liquid waste contained in the hollow base container.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 8 shows an alternative based container according to the present invention.

DETAILED DESCRIPTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide an improved litter box. For the purpose of this disclosure, the word "a" is defined to mean "at least one."

Figure 1:
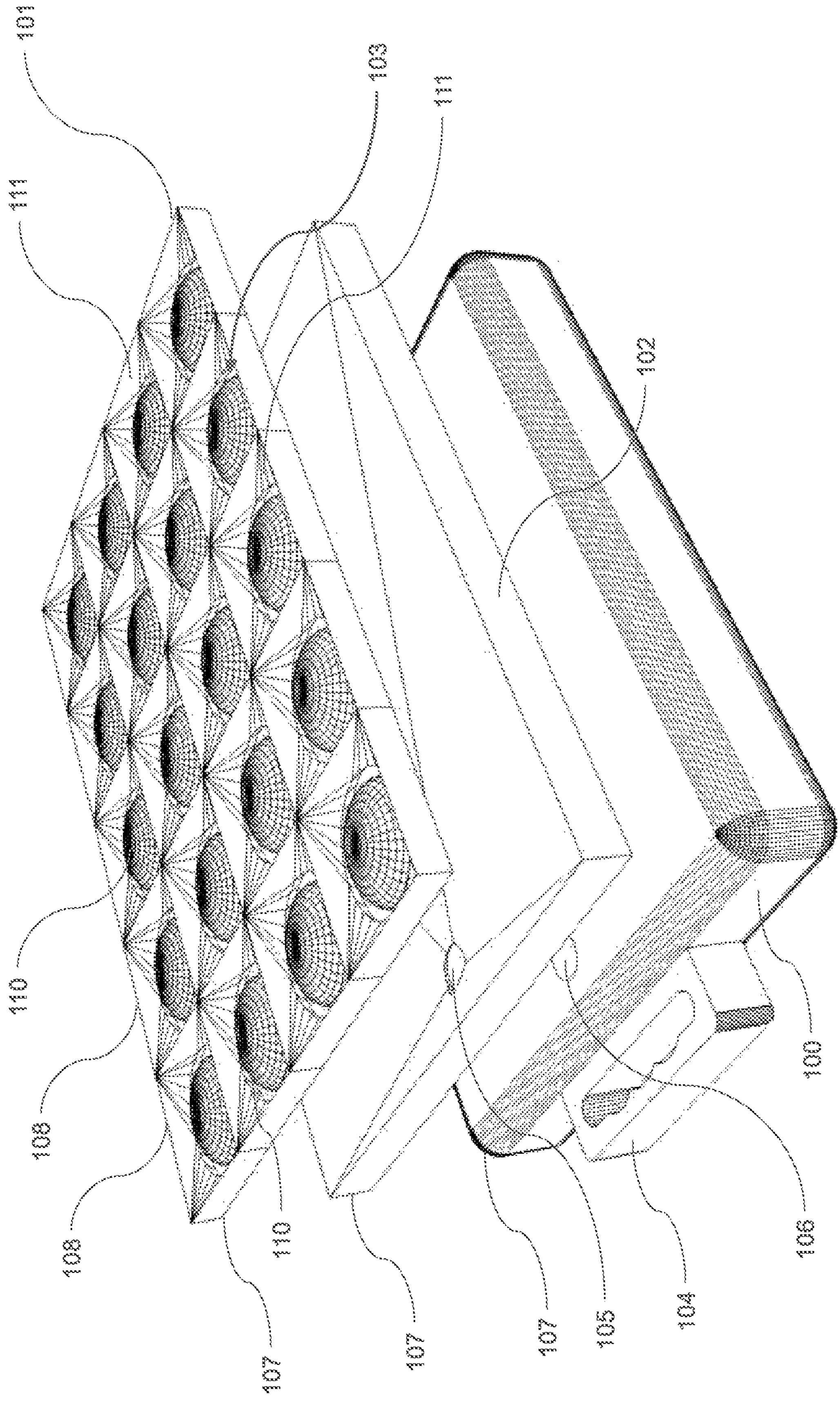
FIG. 1 is an isometric projection of the improved litter box according to an embodiment of the present invention.

FIG. 1 is an isometric projection of the improved litter box according to an embodiment of the present invention. Referring now to FIG. 1, the improved litter box is illustrated. In one embodiment, the improved litter box comprises a base container 100, a sloped transportation member 102, and a segment housing member 101. In one embodiment, the base container comprises a hollow rectangular container configured to retain liquid waste. It should be understood that the size and shape of the base container may vary, however a rectangular shape offers a space saving design while maximizing internal volume. In other embodiments, the base container may comprise an open top (best seen in FIG. 4).

One advantage of the present invention is the volume of the base container allowing minimal maintenance. For example, in one embodiment, the dimensions of the container are 40 cm×60 cm×10 cm for a volume of 24,000 ml enabling approximately 30 days of liquid waste collection of daily use before requiring the user to empty the container.

Advantageously, the closed design of the container prevents odors from escaping. In one embodiment, there is only one small opening 106 enabling liquid from the sloped transportation member 102 to pass through the opening 106 into the container 100. The sloped transportation member 102 is configured to be positioned directly on top of the base container 100. In one embodiment, a drain hole 105 is positioned on the sloped transportation member 102, wherein the drain hole is configured to be aligned over opening 106 such that liquid from the sloped transportation member 102 is configured to be funneled into the drain hole 105 then through opening 106 to be stored in container 100. It should be understood, that the slope and design of the funneling surface may vary as well as the location of the drain hole 105. However, it is critical that the location of the drain hole 105 and the opening 106 of the container 100 are correlated. In other embodiments, more than one opening and/or drain hole may be provided, wherein each opening corresponds to a drain hole. In another embodiment, a conduit or a similar transportation member may be used to connect an opening to a drain hole. In other embodiments, the one or more openings are aligned under the one or more drain holes.

In one embodiment, the base container 100 comprises a handle 104 enabling the user a method of maneuvering the container 100 during installation and when necessary to remove the container 100 from the system during maintenance. Although not illustrated, in some embodiments, an outer housing may be provided, wherein the outer housing is configured to keep the individual components 107 of the system (base container 100, sloped transportation member 102, and segment housing member 101) in position during use. The handle enables the user to remove the base container 100 from the outer housing to empty any liquid waste accumulated during use. In another embodiment, the system of the present invention may be provided to another existing unit or housing, such that the system may be an add-on to a related system.

Figure 2:
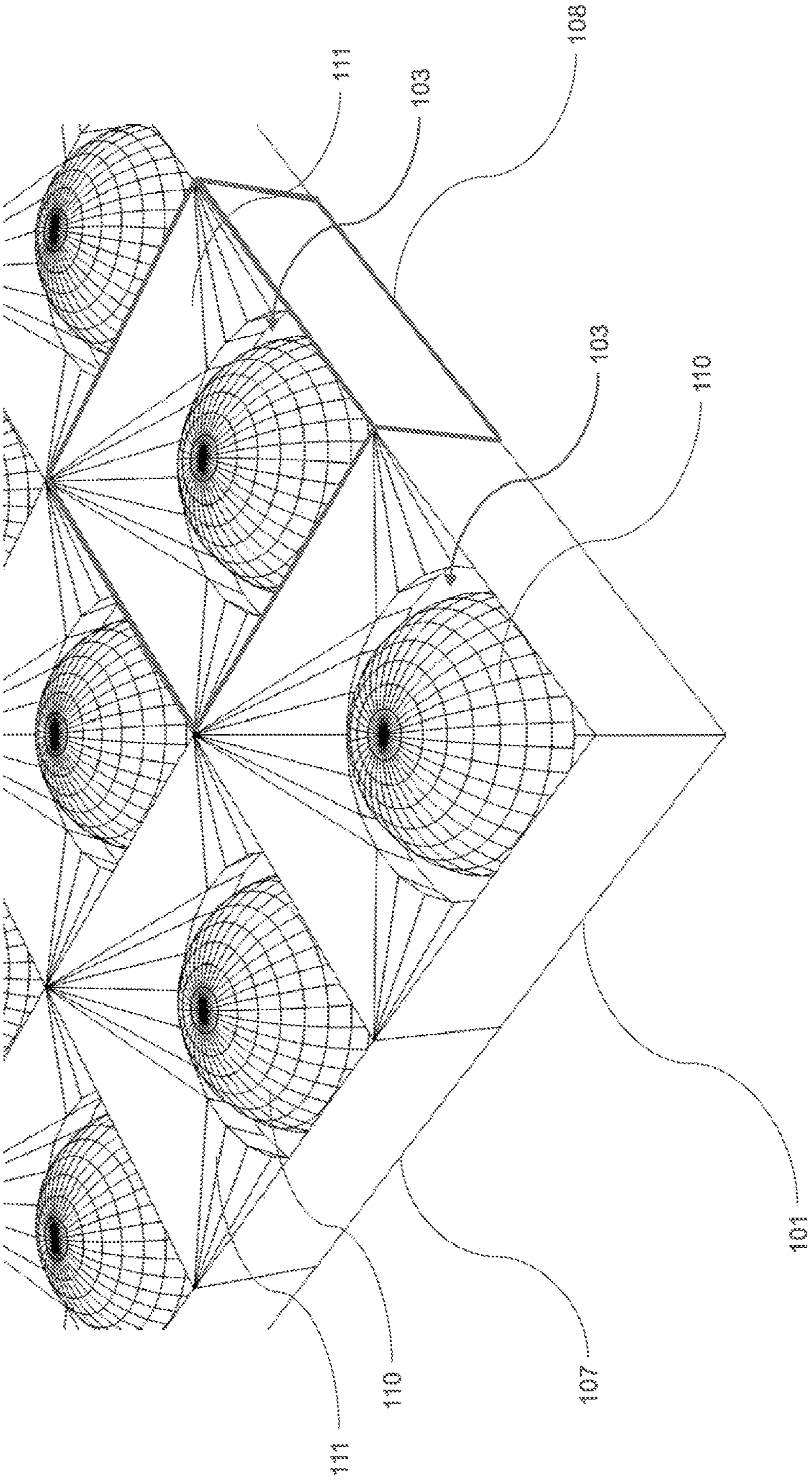
FIG. 2 is a top view of the improved litter box according to an embodiment of the present invention.

FIG. 2 is a top view of the improved litter box according to an embodiment of the present invention. Referring now to FIGS. 1-2, in one embodiment, the segment housing member 101 is positioned on top of the sloped transportation member 102, wherein the segment housing member 101 comprises a plurality of segment units 108, each segment unit of the plurality of segment units having a segment member 110, wherein the segment member's position in the segment unit provides a space 103, the space allowing liquid waste to pass through the segment housing member 101 and enter the sloped transportation member 102 below the segment housing member 101. The segment member 110 creates an interference with the segment housing member 101 providing a specific drainage mechanism, i.e. space 103. The space must be smaller than any sand particles used with the present invention.

Figure 3:
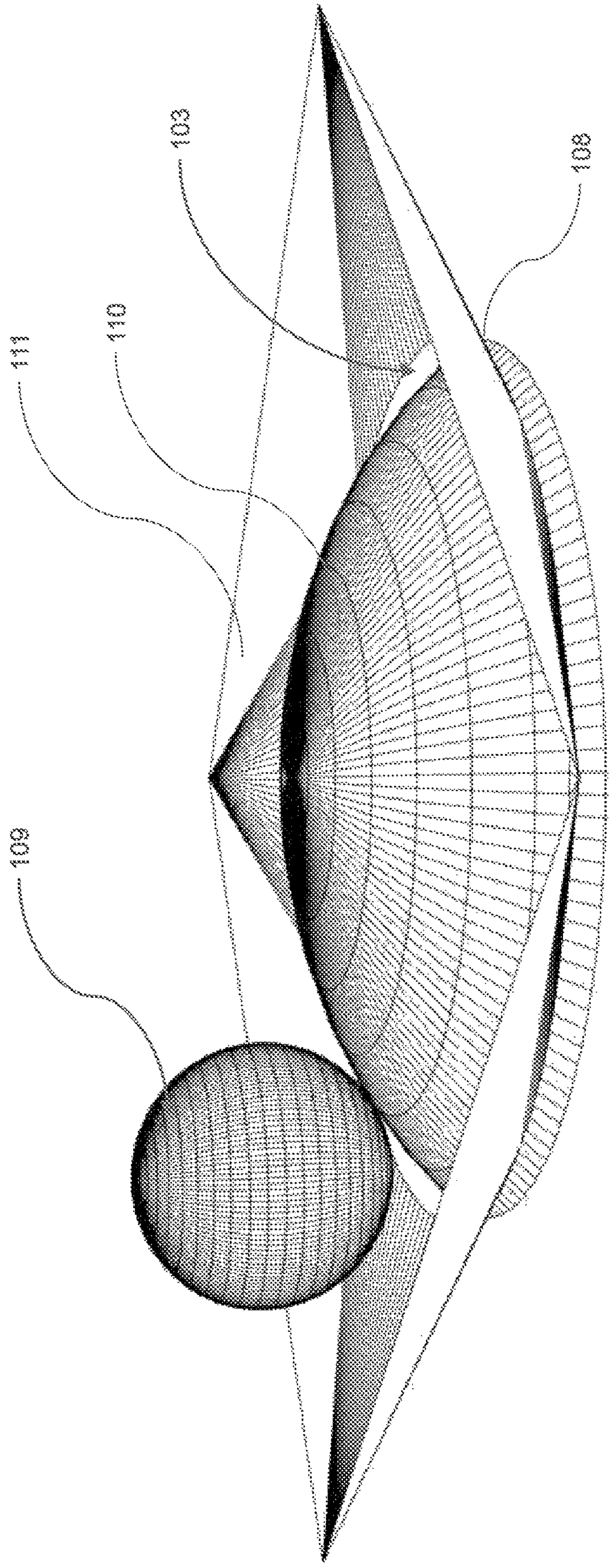
FIG. 3 is a detailed view of the segment unit according to an embodiment of the present invention.

FIG. 3 is a detailed view of the segment unit 108 according to an embodiment of the present invention. Referring now to FIG. 3, a segment unit 108 is illustrated. In one embodiment, the segment unit 108 comprises a segment member 110. In one embodiment, the segment member 110 is of spherical shape as illustrated in FIGS. 1-3, however the shape may vary. The function of the material of the segment member is to increase the efficiency of the drainage system, which will be explained in greater details below.

As previously mentioned, the space 103 between the segment housing member 101 and the segment member 110 enables liquid waste to be drained through the system, and collected into the base container 100. In some embodiments, a plurality of litter sand particles 109 are positioned in the plurality of segment units, and more specifically above the space 103. The litter sand particles selected may be absorbent, non-absorbent, and homogenous or non-homogenous of size and shape. There are advantages of both types, however non-absorbent particles enable the liquid waste to separate from the litter particles and pass through the space 103 without the litter particles clumping as well known in the art. The spherical shape of the segment member 110 provides a sloped or angled surface directed towards the space 103. Similarly, the material 111 positioned in the segment unit 108 is also sloped or angled towards the space 103. These angled slopes provide minimal touchpoints enabling efficient draining throughout the system. One skilled in the art may appreciate the size and scale of each segment unit 108 compared to a litter sand particle 109. However, it should be understood, that the number of plurality of segment units 108 may vary, which modifies the size of each segment unit 108.

Figure 4:
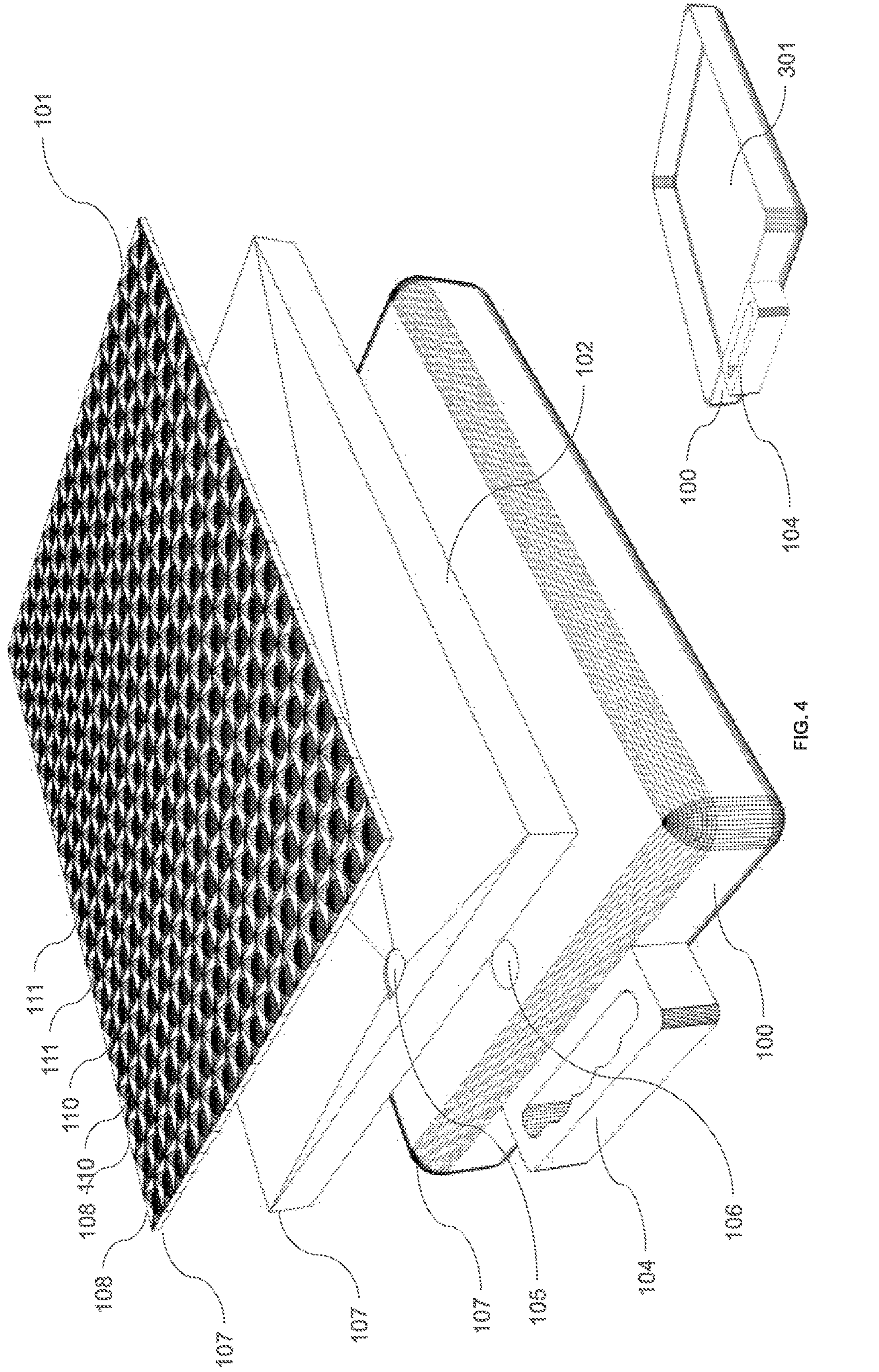
FIG. 4 shows an alternative segment housing member according to an embodiment of the present invention.

FIG. 4 shows an example of a greater number of segment units 108 in the segment housing member 101. This provides more spaces 103 (drainage areas), and decreases the distance the liquid waste needs to travel to each space 103. In some embodiments, the amount of litter sand particles used in the system may be reduced in this embodiment. This is due to the thickness of litter sand particles used as well as the efficiency of the system, since the litter is not configured to clump as most of the liquid waste drains of each individual litter sand particle. One skilled in the art may recognize many variations and experimentation may be possible to discover the most efficient system, however the basic principles of the system remain.

Figure 5:
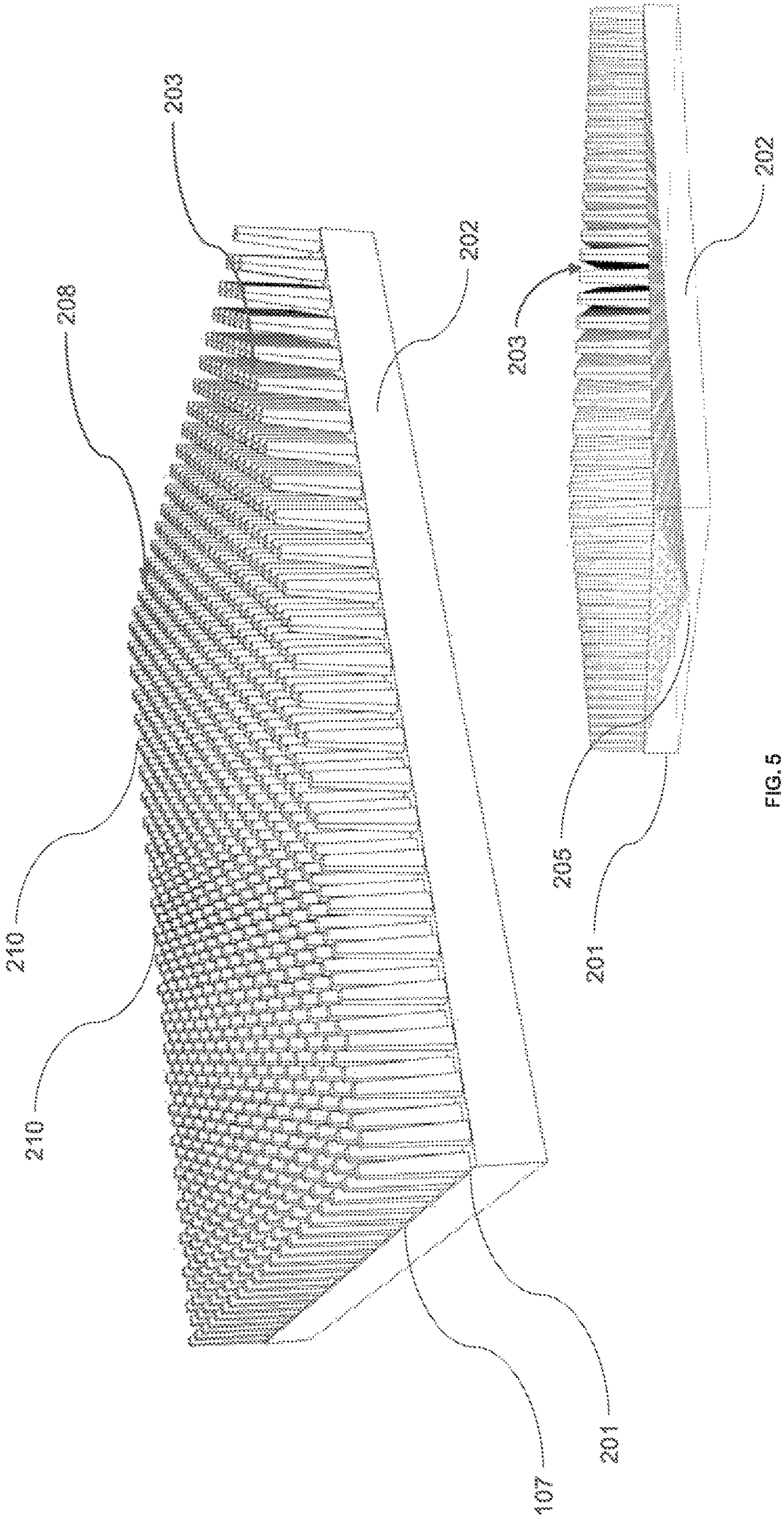
FIG. 5 shows an alternative segment housing member according to an embodiment of the prevention invention.
Figure 6:
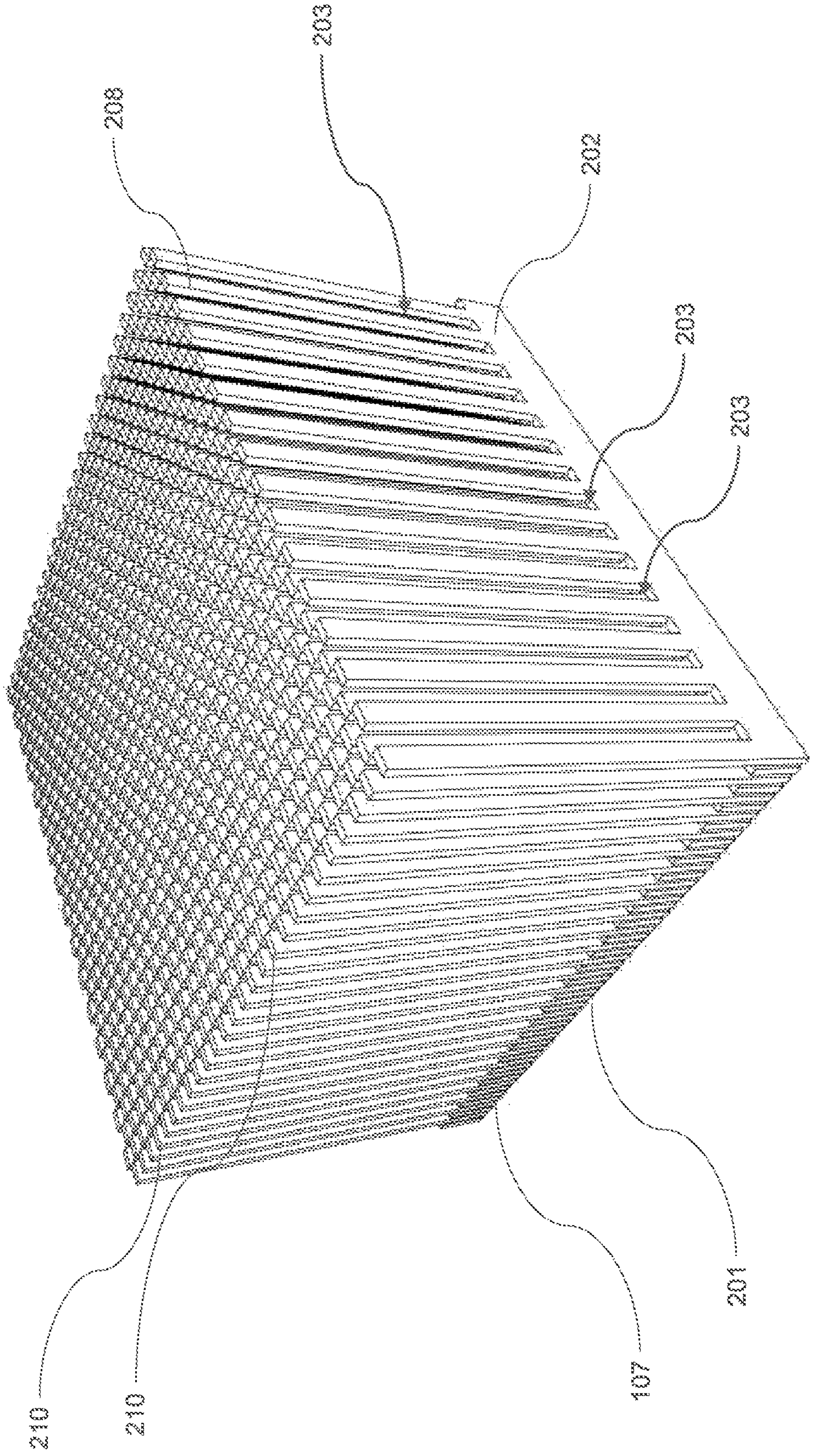
FIG. 6 is a top view of the alternative segment housing member according to an embodiment of the prevention invention.

In some embodiments, the segment housing member and transportation member is a single integral unit. Further, the shape of the unit, and more particularly the segment housing member 101 and transportation member 102 may vary. FIG. 5 is an example of an alternative segment housing member 201 according to an embodiment of the prevention invention. Referring now to FIG. 5, the alternative segment housing member 201 with an alternative transportation member 202 is a single integral unit. The alternative segment housing member 201 comprises a plurality of alternative segment units 208, wherein the segment units feature long rectangular members providing drainage 209 between each member (as seen in FIG. 6). In some embodiments, sand litter particles are configured to sit and be positioned on top of the segment units 208, wherein liquid waste is configured to drain down drainage areas 209 into the transportation member 202, then into the base container as previously discussed. It should be understood, that spherical and rectangular segment units are just a few examples, and other shapes and formations are possible, including but not limited to triangular, conic, circular, square, and rectangular (horizontally positioned).

Figure 7:
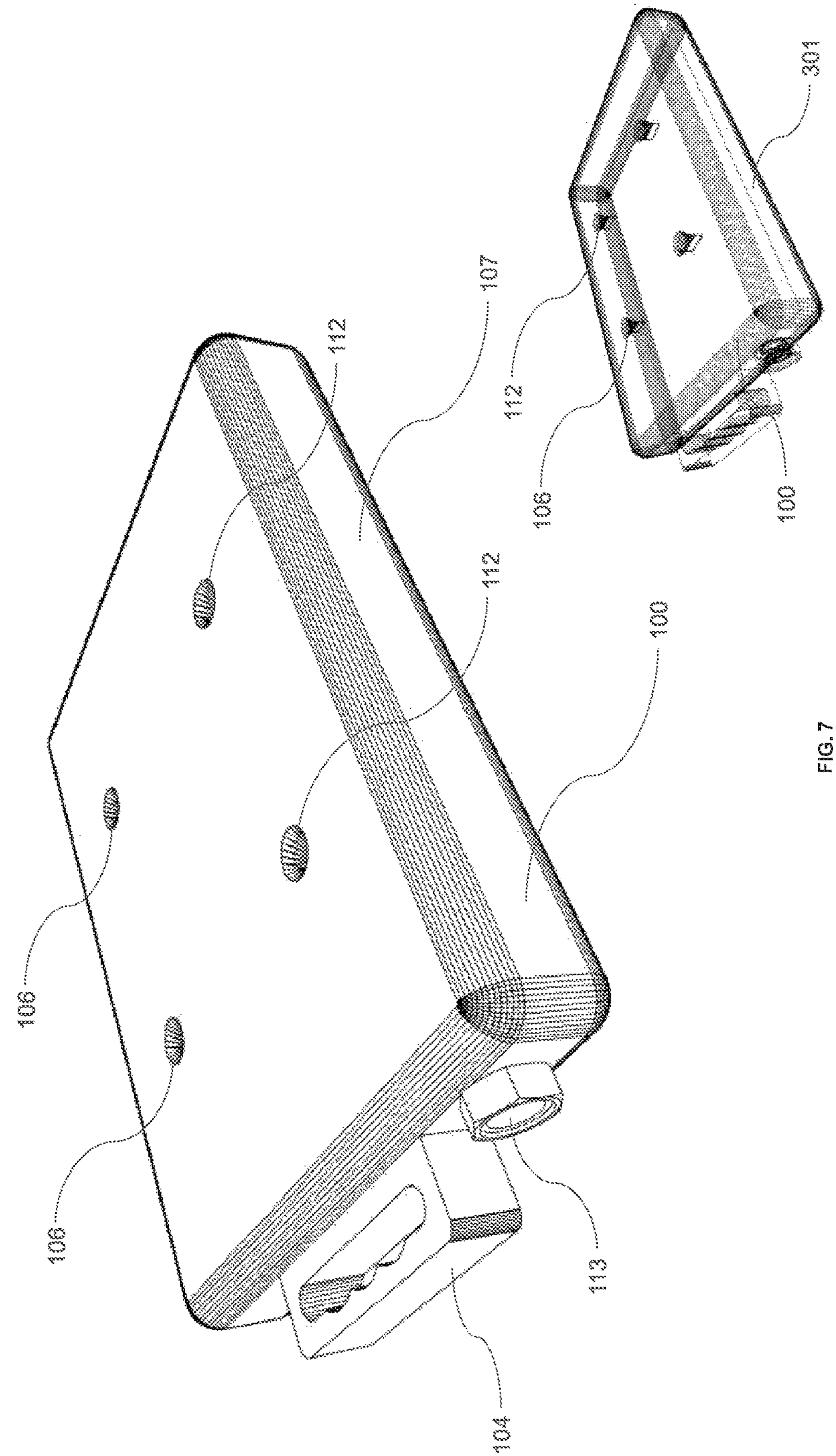
FIG. 7 shows an alternative base container having absorbent pad positioned within according to an embodiment of the present invention.
Figure 8:
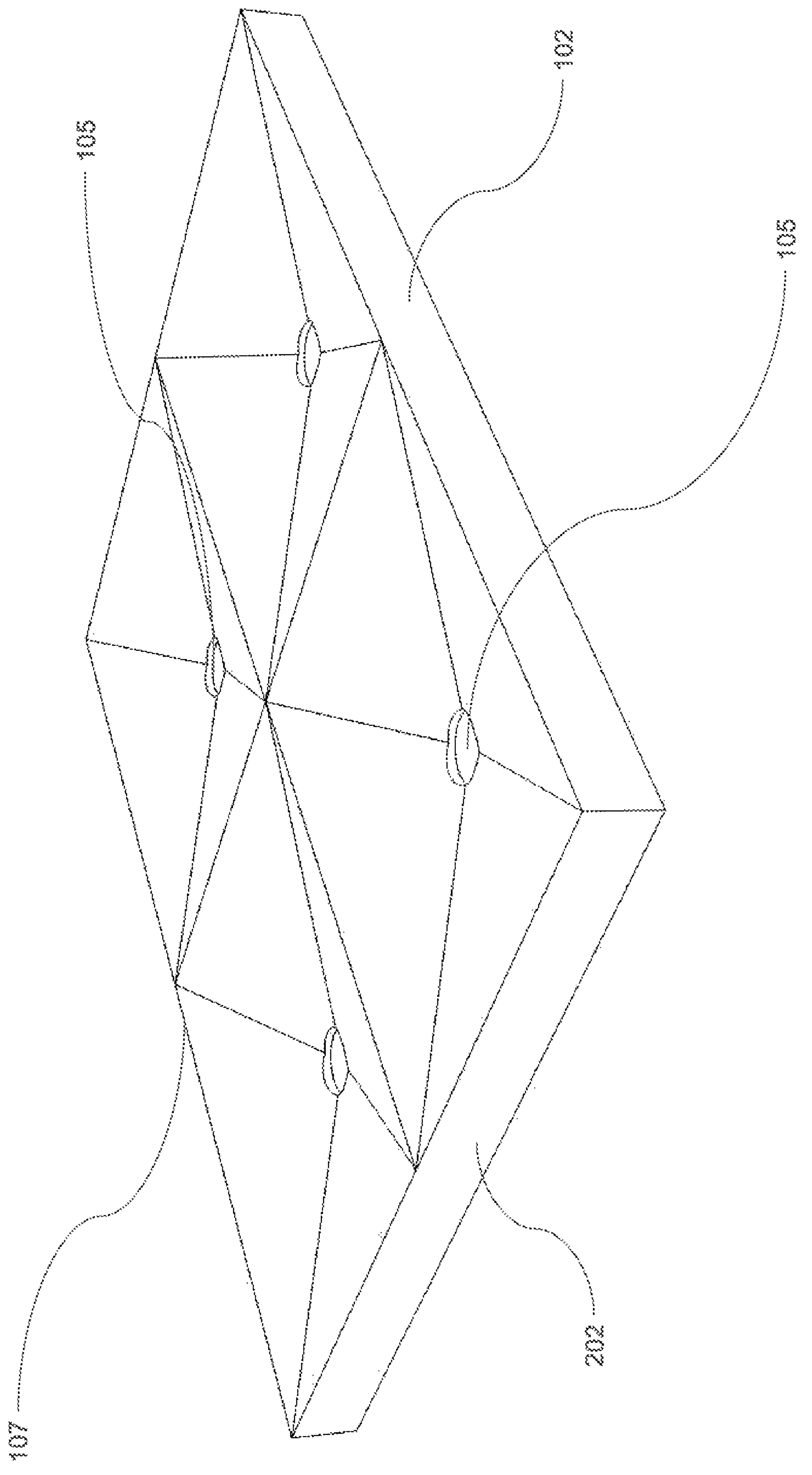
FIG. 8 shows an alternative sloped transportation member according to the present invention.
Figure 9:
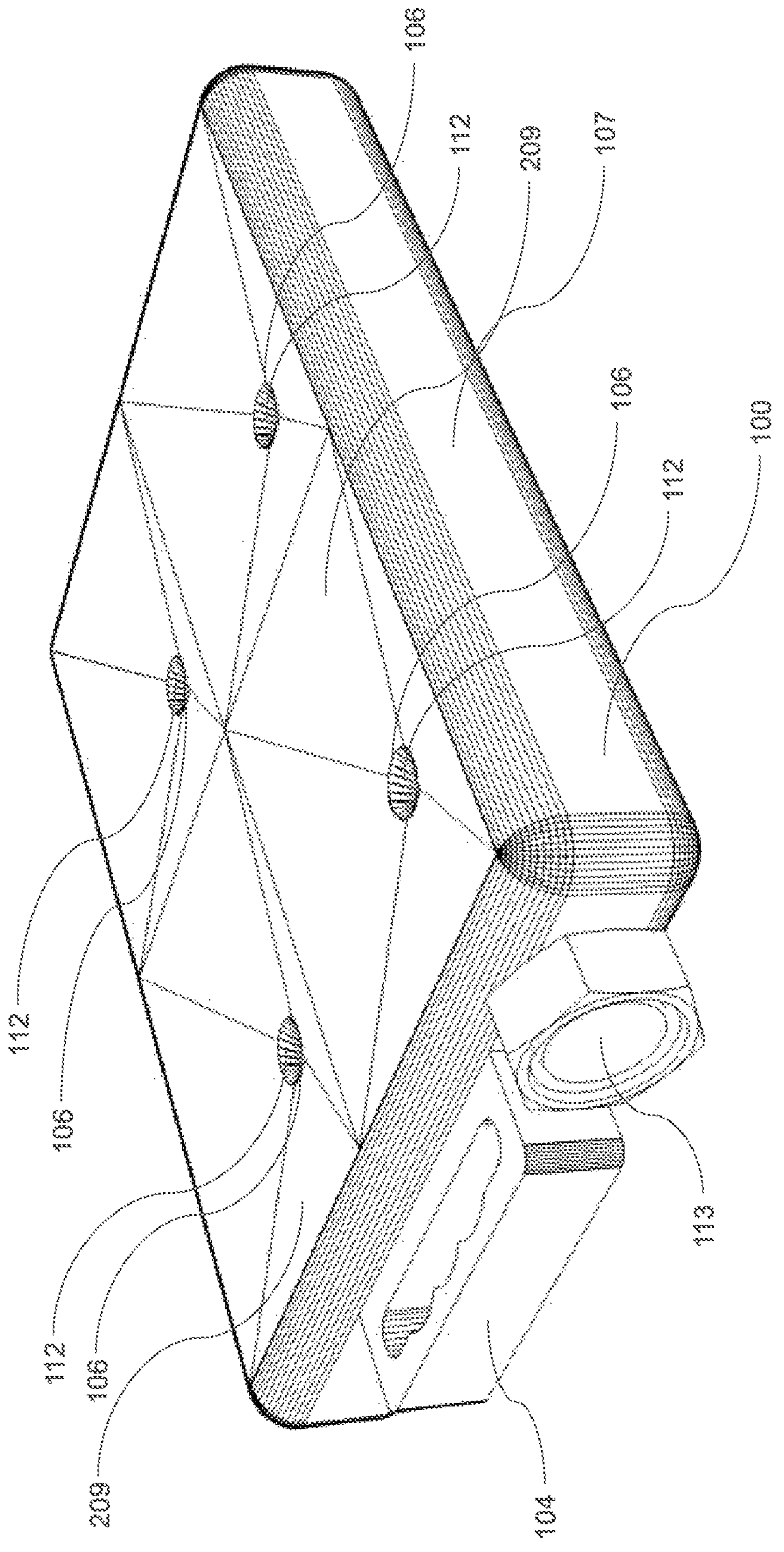
Figure 10:
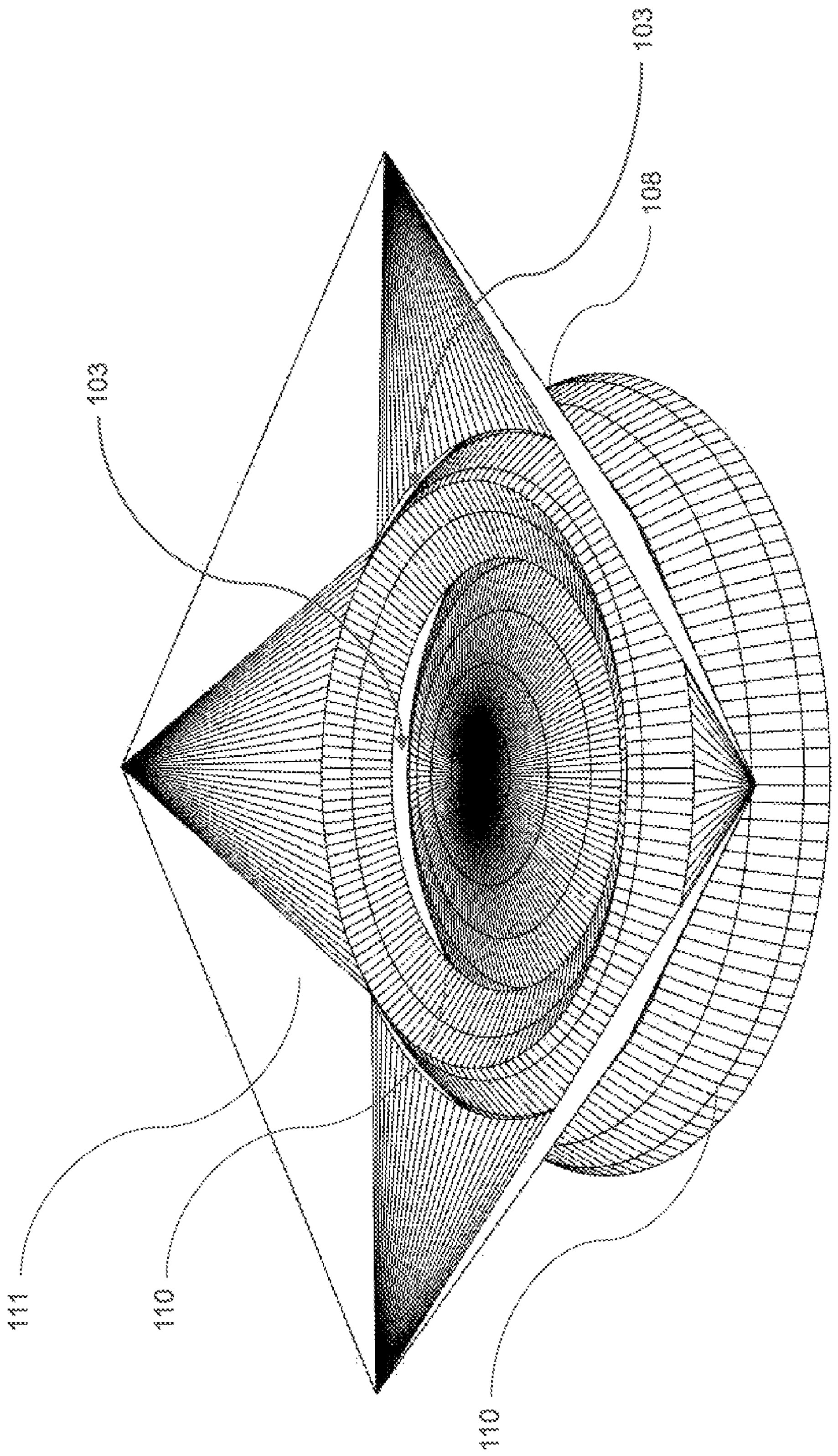
FIG. 10 shows an alternative segment housing member according to the present invention.
Figure 11:
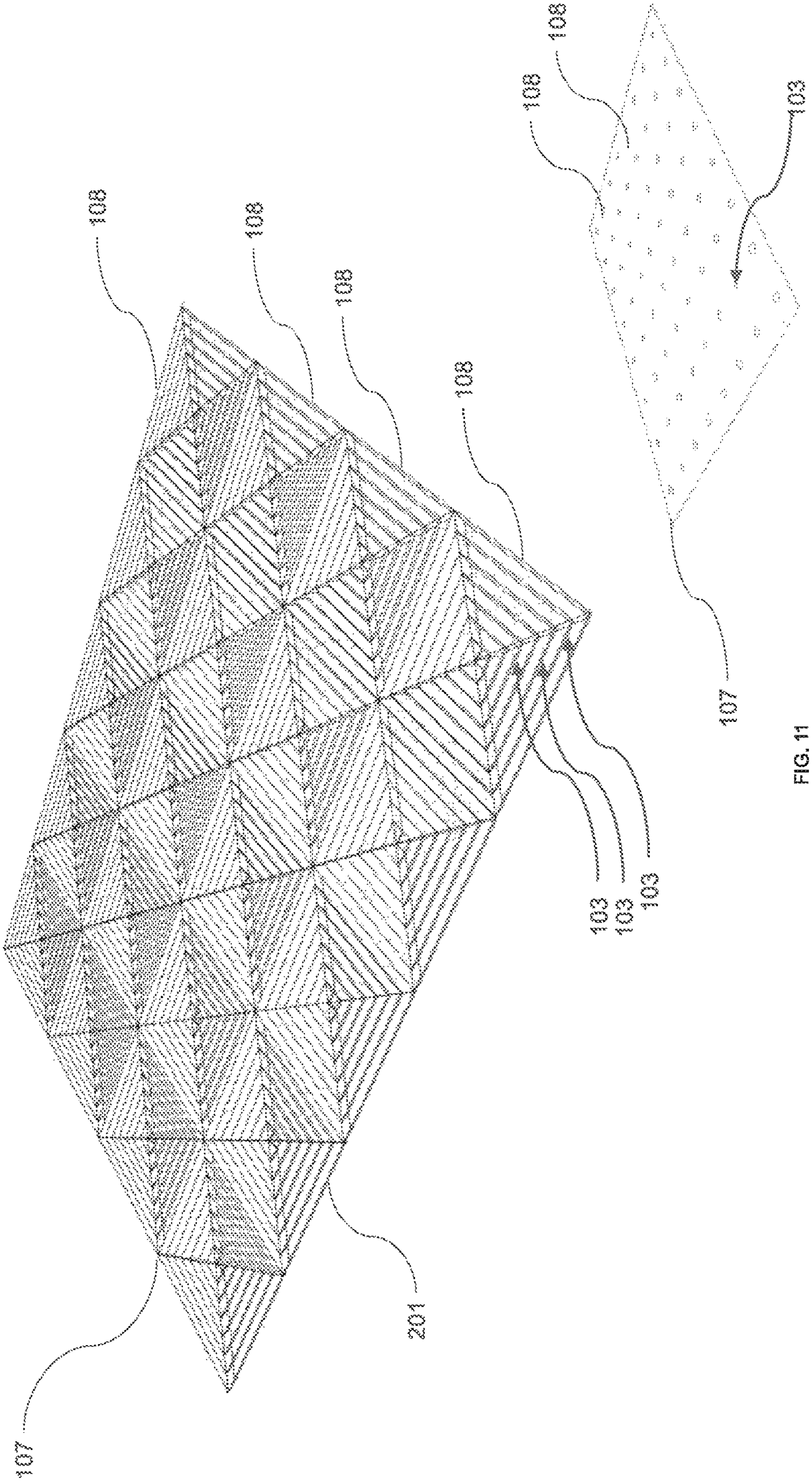
FIG. 11 shows an alternative segment housing member according to the present invention.
Figure 12:
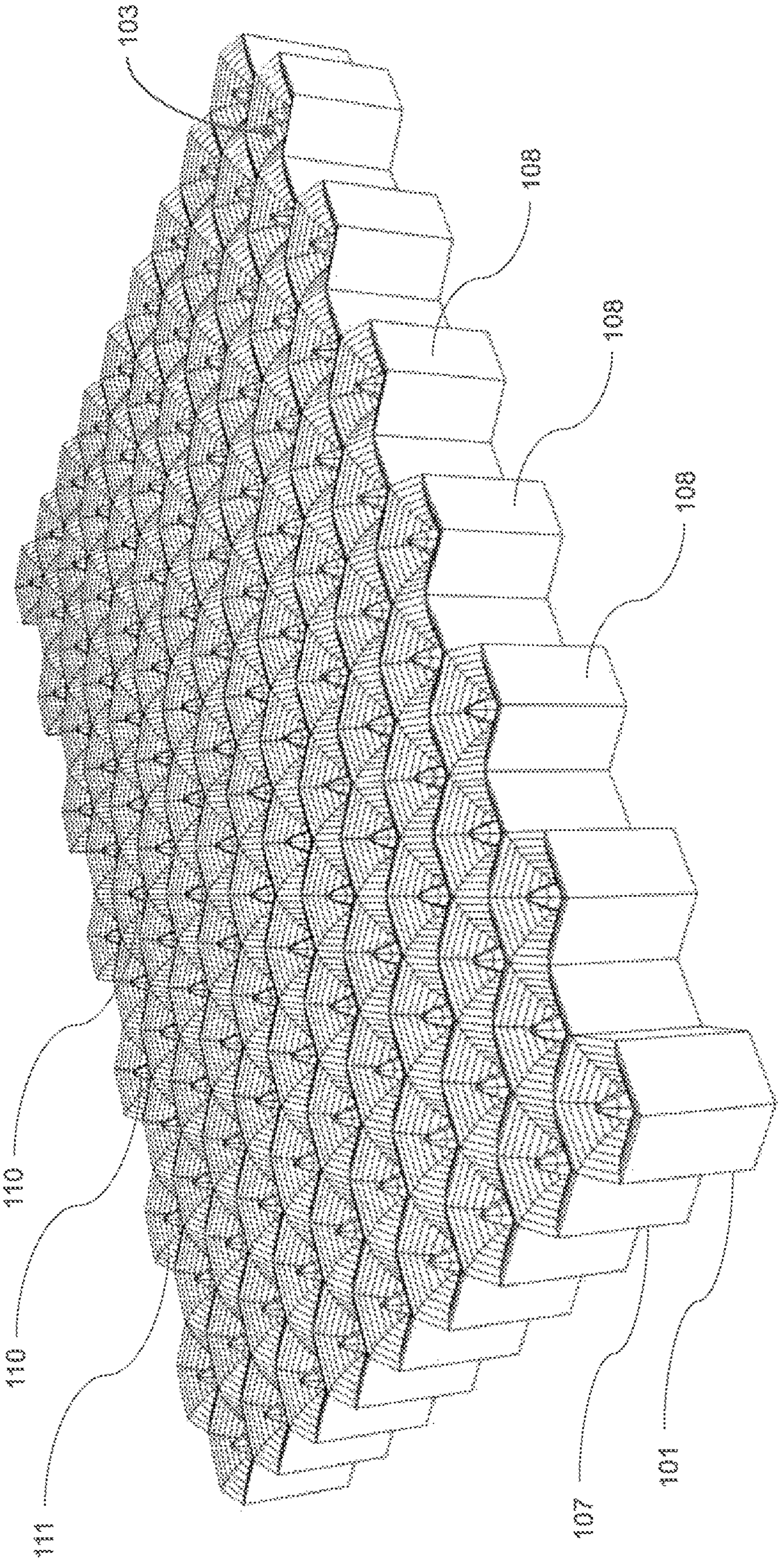
FIG. 12 shows an alternative segment housing member according to the present invention.
Figure 13:
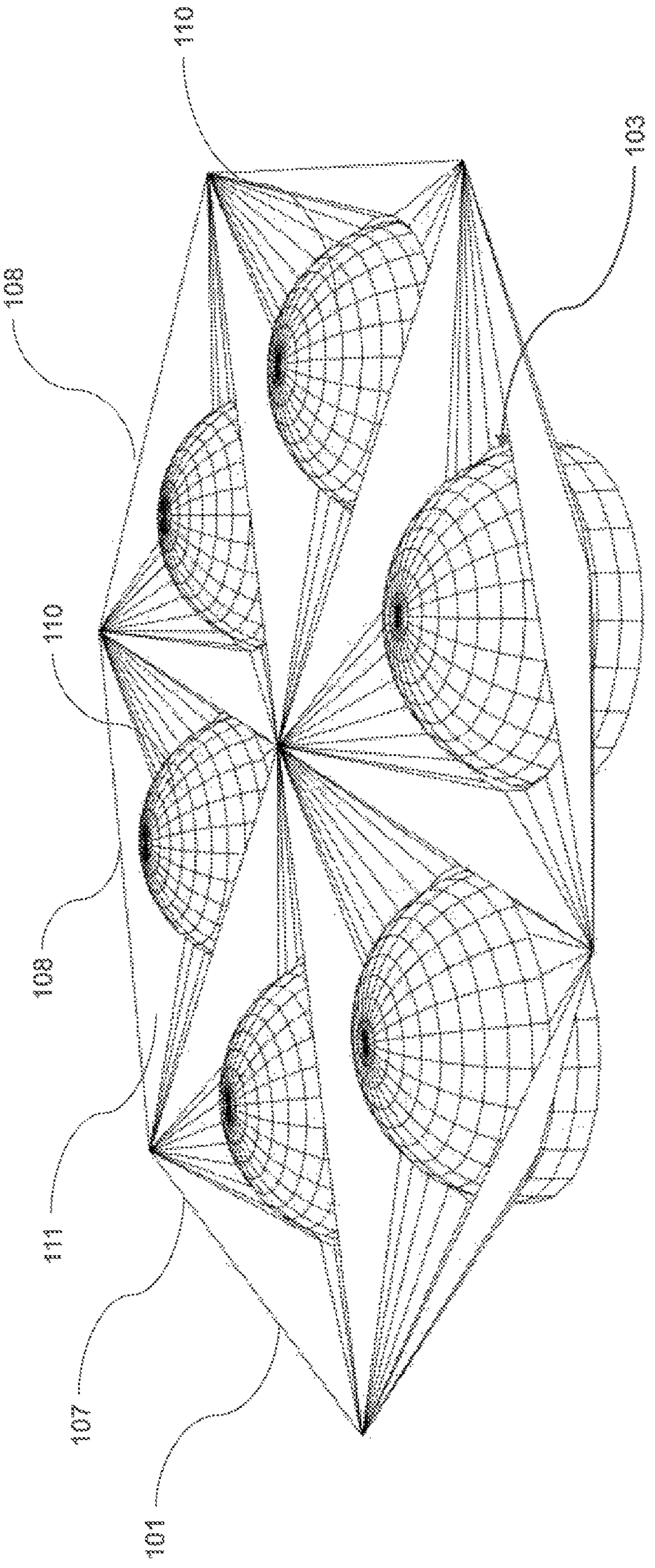
FIG. 13 shows an alternative segment housing member according to the present invention.
Figure 14:
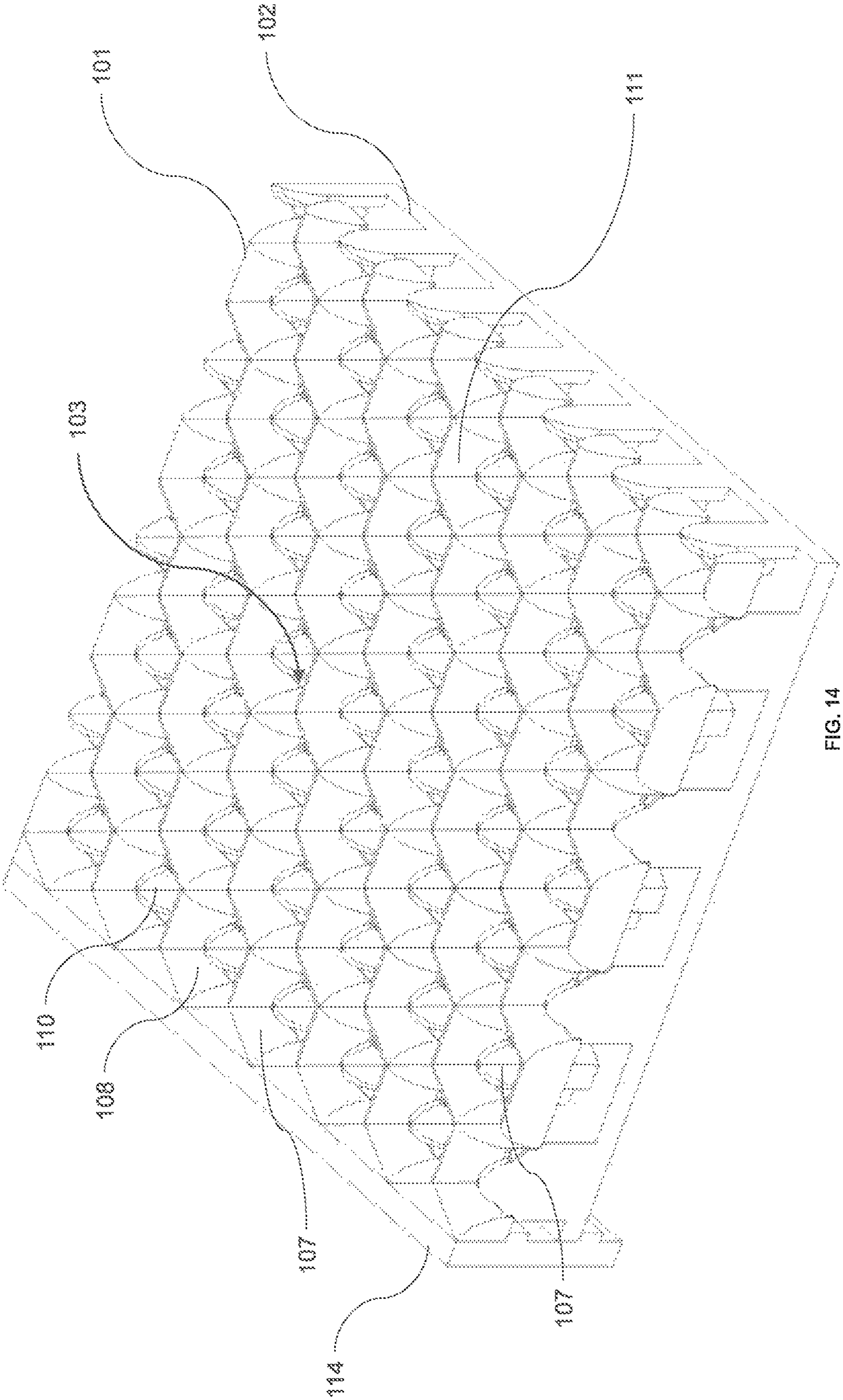
FIG. 14 shows an alternative segment housing member according to the present invention.
Figure 15:
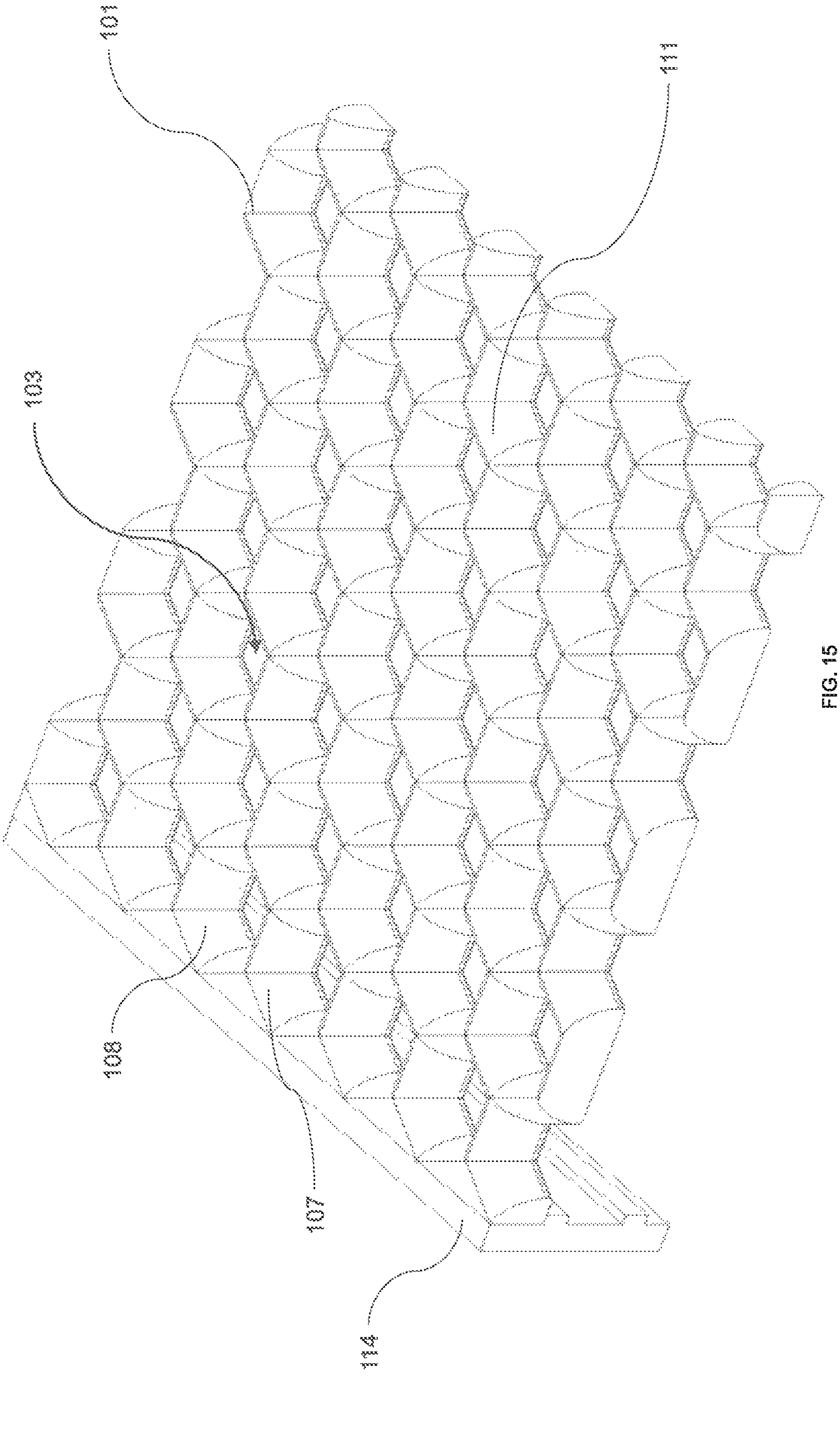
FIG. 15 shows an alternative segment housing member according to the present invention.
Figure 16:
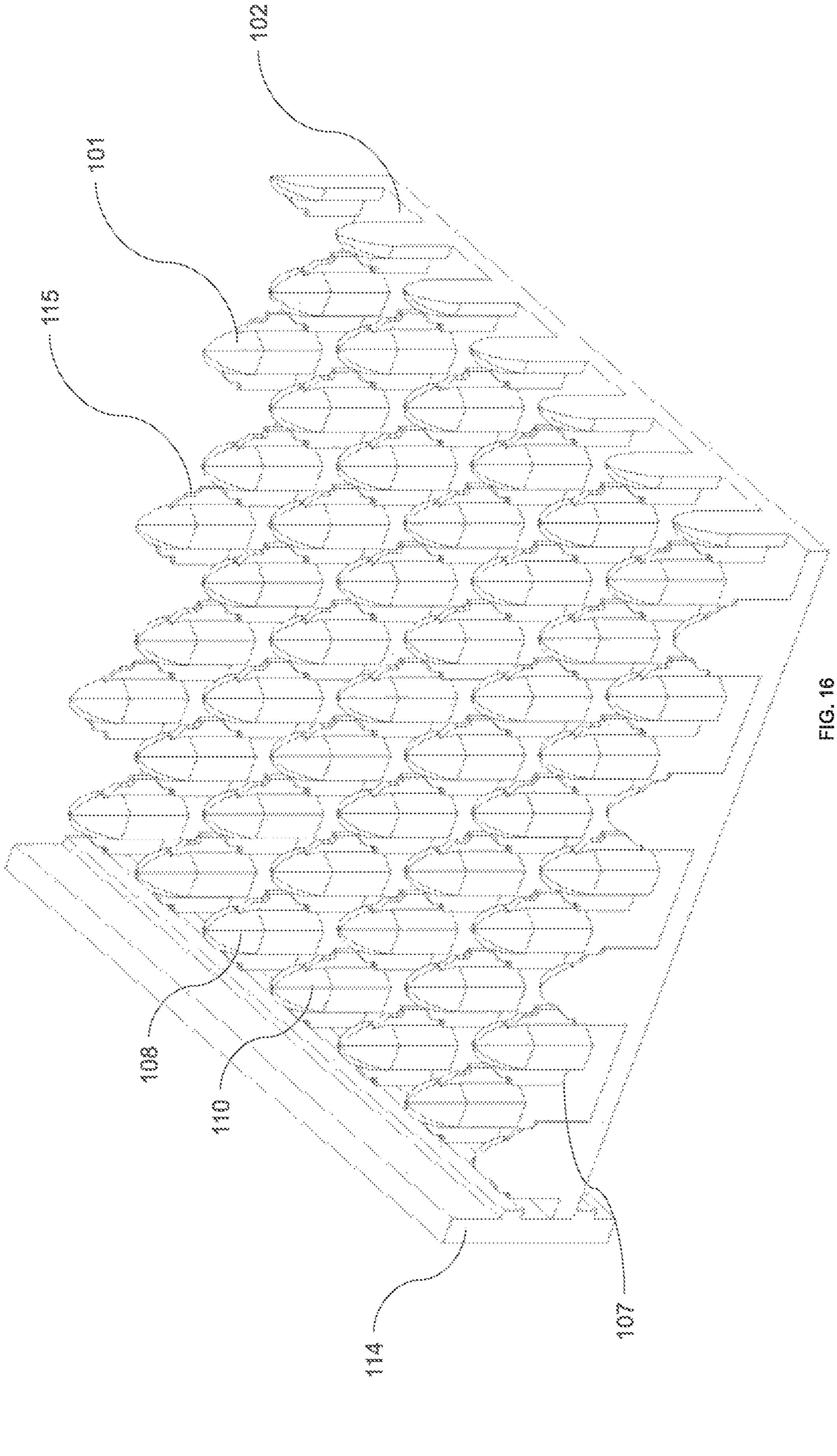
FIG. 16 shows an alternative segment housing member according to the present invention.
Figure 17:
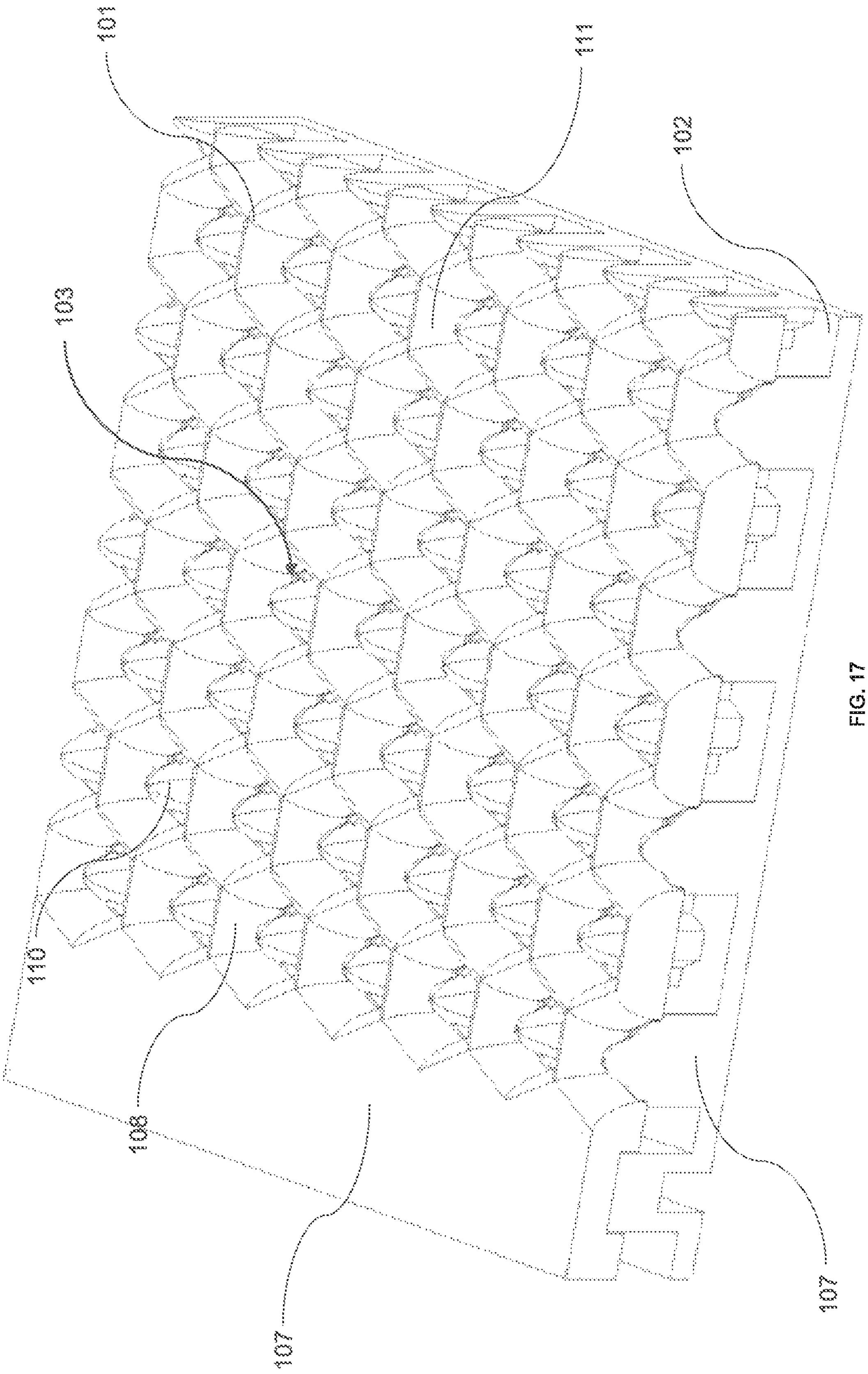
FIG. 17 shows an alternative segment housing member according to the present invention.
Figure 18:
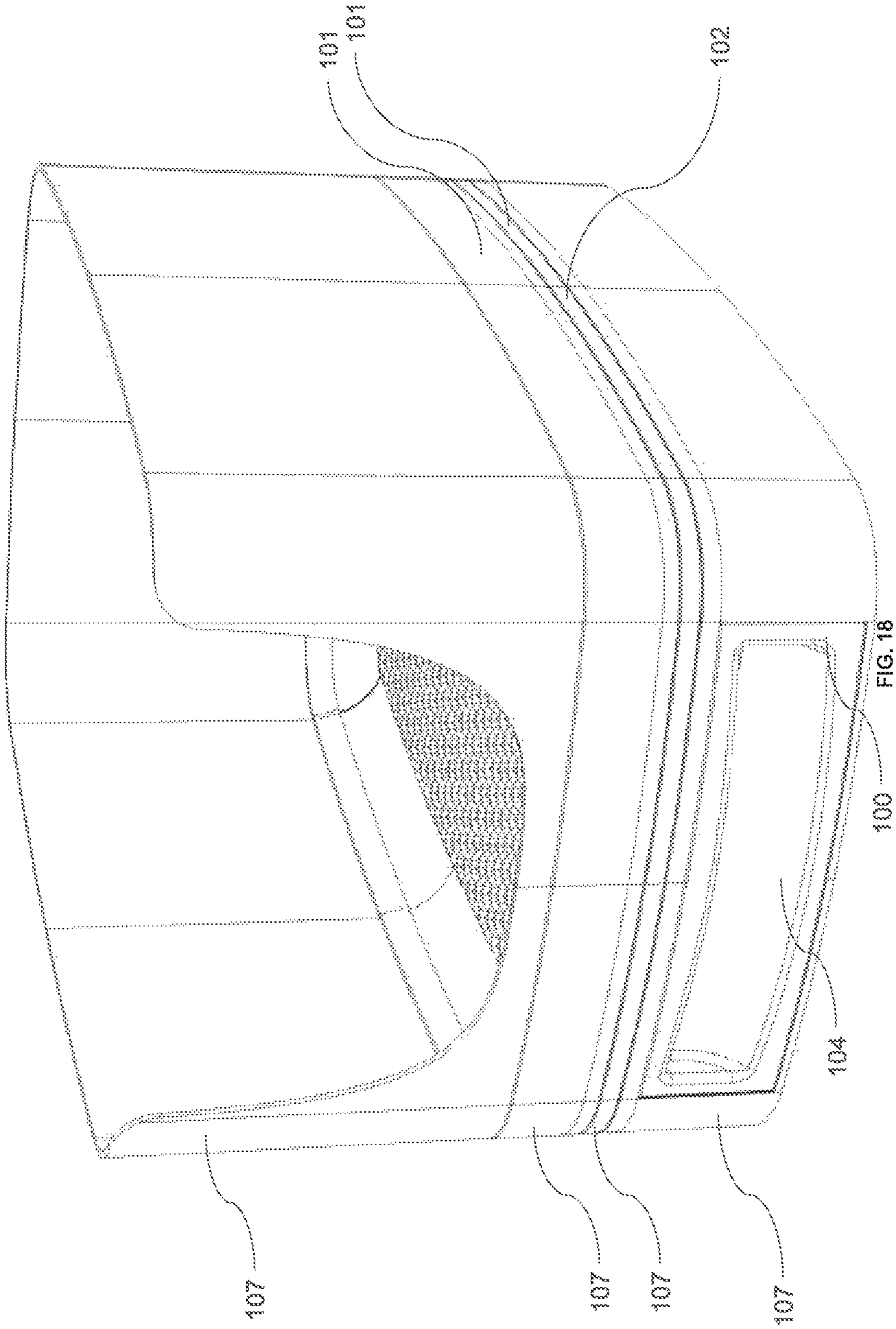
FIG. 18 is an overview of the improved litter box according to an embodiment of the present invention.
Figure 19:
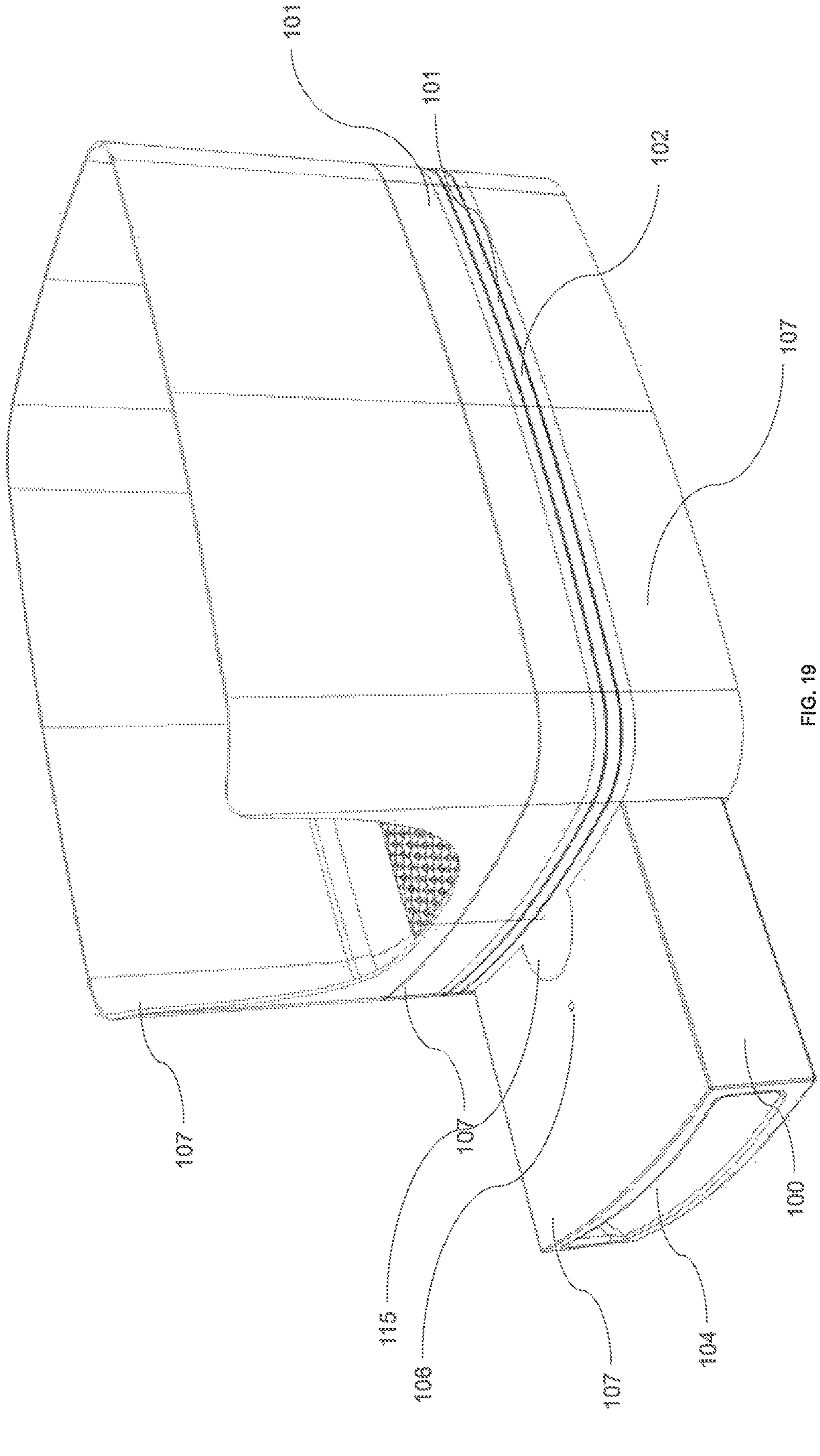
FIG. 19 is an overview of the improved litter box with the base container partially removed according to an embodiment of the present invention.
Figure 20:
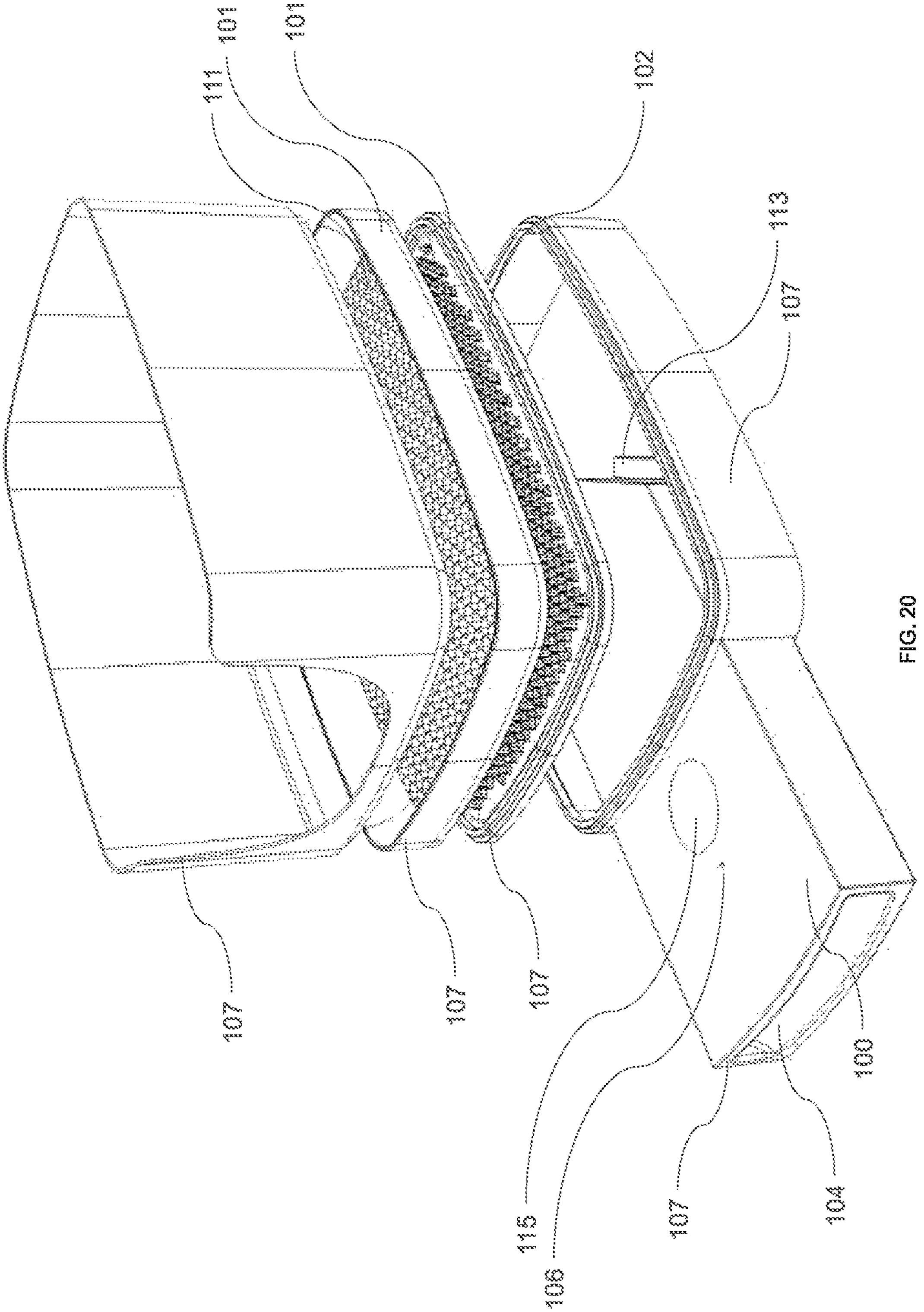
FIG. 20 is an exploded view of the present invention.

In some embodiments, components may be provided to improve the efficiency of the system. For example, in one embodiment, as seen in FIG. 7 an absorbent material pad 301 may be provided in the hollow base container 100 to extend the required maintenance timeline and draining of the container of liquid waste as the absorbent material pad is configured to absorb a portion of the liquid waste. In other embodiments, an absorbent material pad may be placed below the litter sand particles in the segment housing member or in another location in the system. In one embodiment, as seen in FIG. 7 a one-way valve 112 may be positioned in opening 106, enabling liquid waste to enter the container 101 but preventing odor from escaping the container 101. In one embodiment, the one-way valve may be a duckbill valve.

Referring now to FIGS. 14-17, an additional embodiment of a segment housing member 101 comprising a plurality of segment units 107 showing the space 103 around each augment unit of the layer 101. Shown in these drawings is layer support 114 configured to support additional layers, wherein more specifically, the support 114 is a wall or part of another layer that can act as a shelf or support to hold the layer above. Various different arrangements and designs of the support 114 are possible and they may include tabs, flanges, and surface contours configured to retain, support, etc. layers of the present invention.

Figure 21:
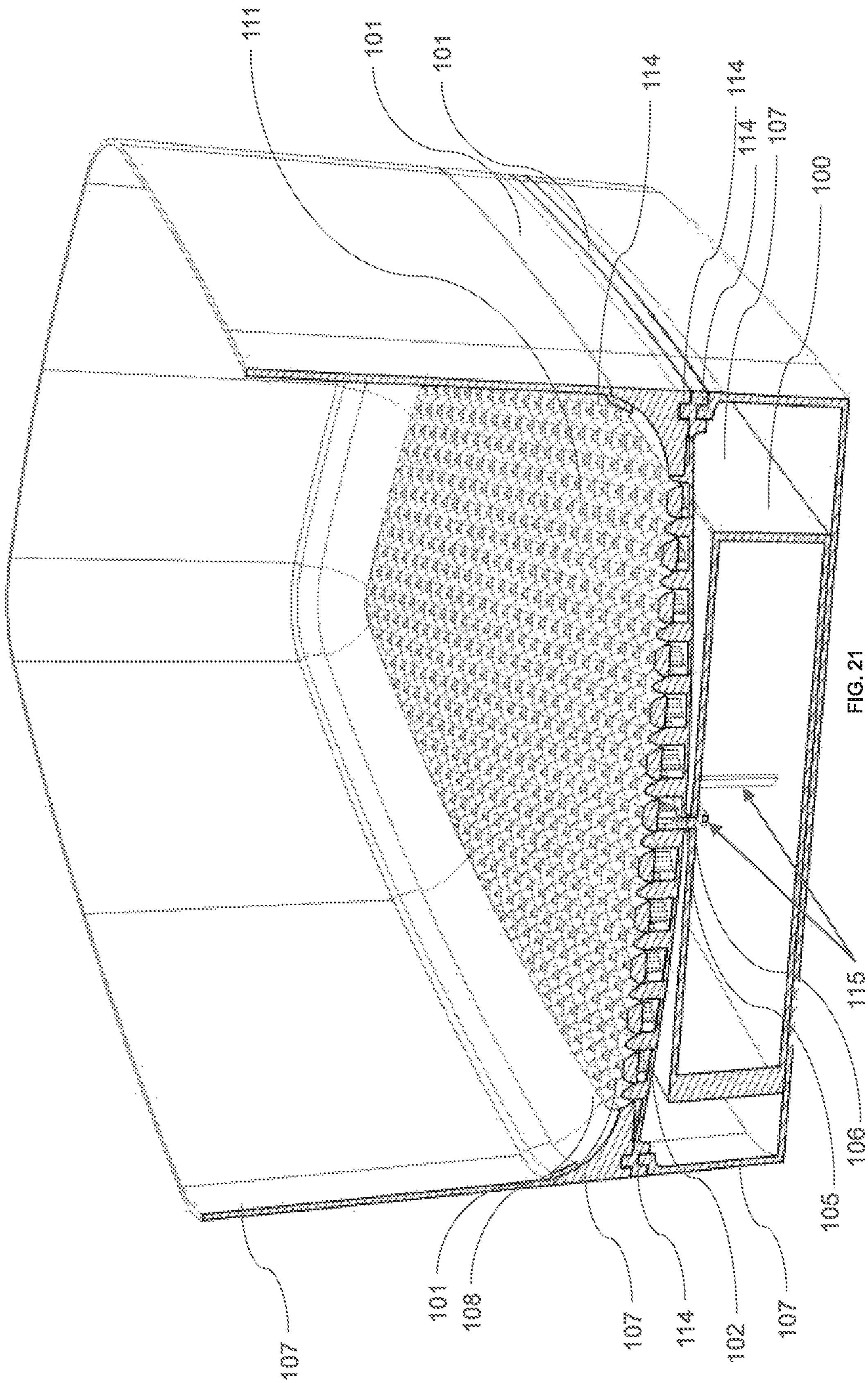
FIG. 21 is a sectional view of the present invention.
Figure 22:
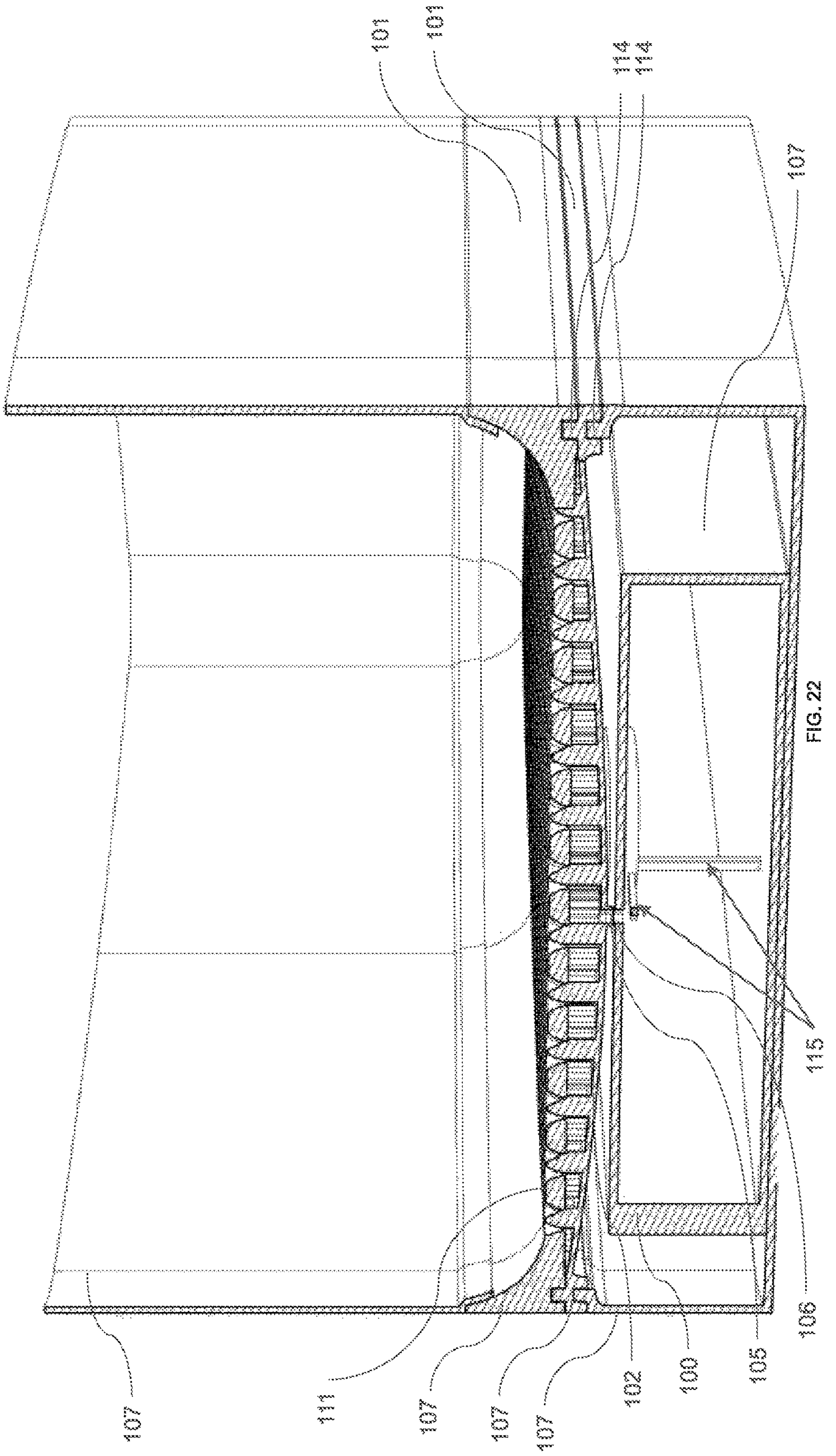
FIG. 22 is an additional sectional view of the present invention.
Figure 23:
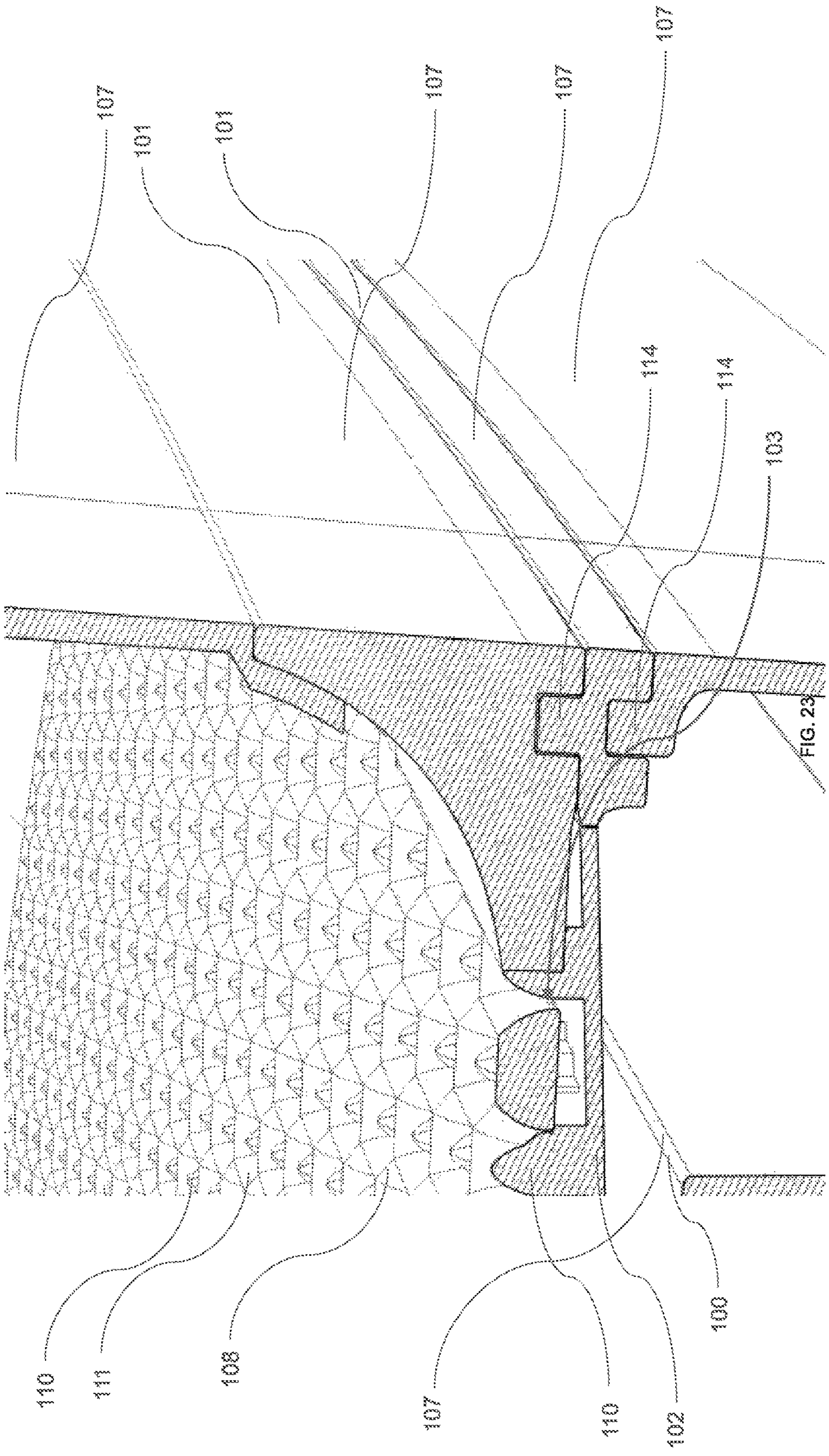
FIG. 23 is a detailed sectional view of the present invention.
Figure 24:
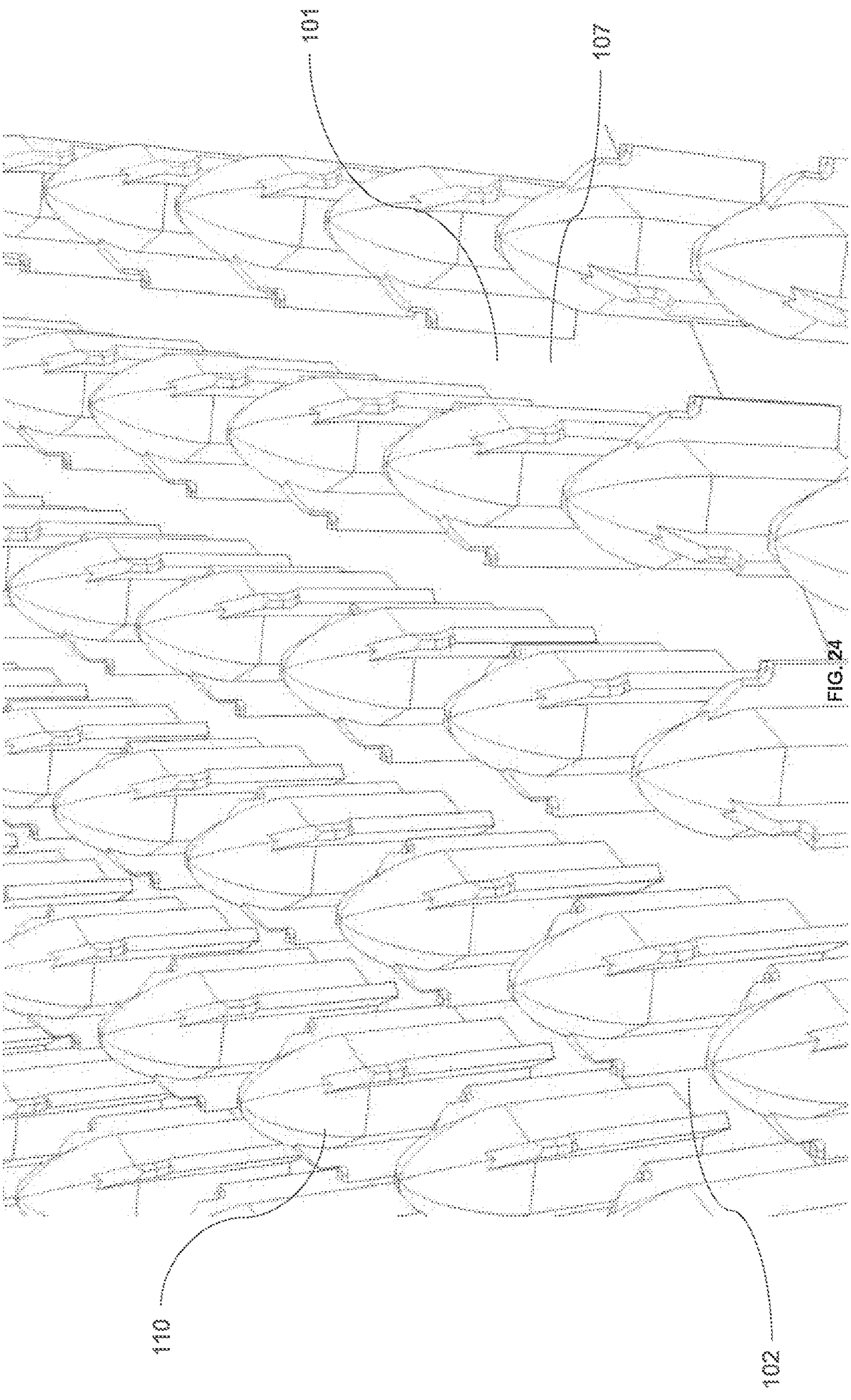
FIG. 24 is a detailed view of segment members according to an embodiment of the present invention.
Figure 25:
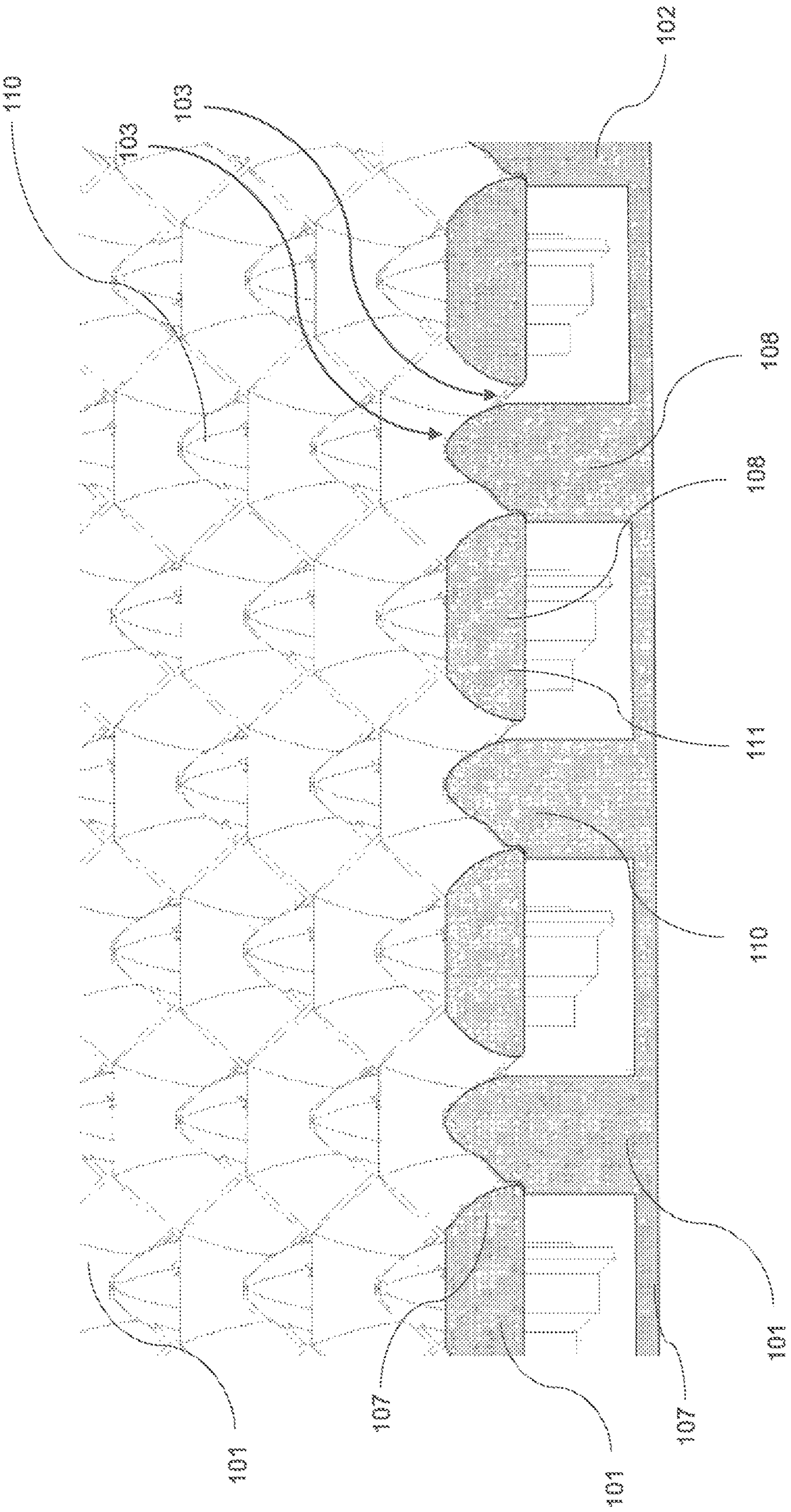
FIG. 25 is a detailed sectional view of segment units according to an embodiment of the present invention.
Figure 26:
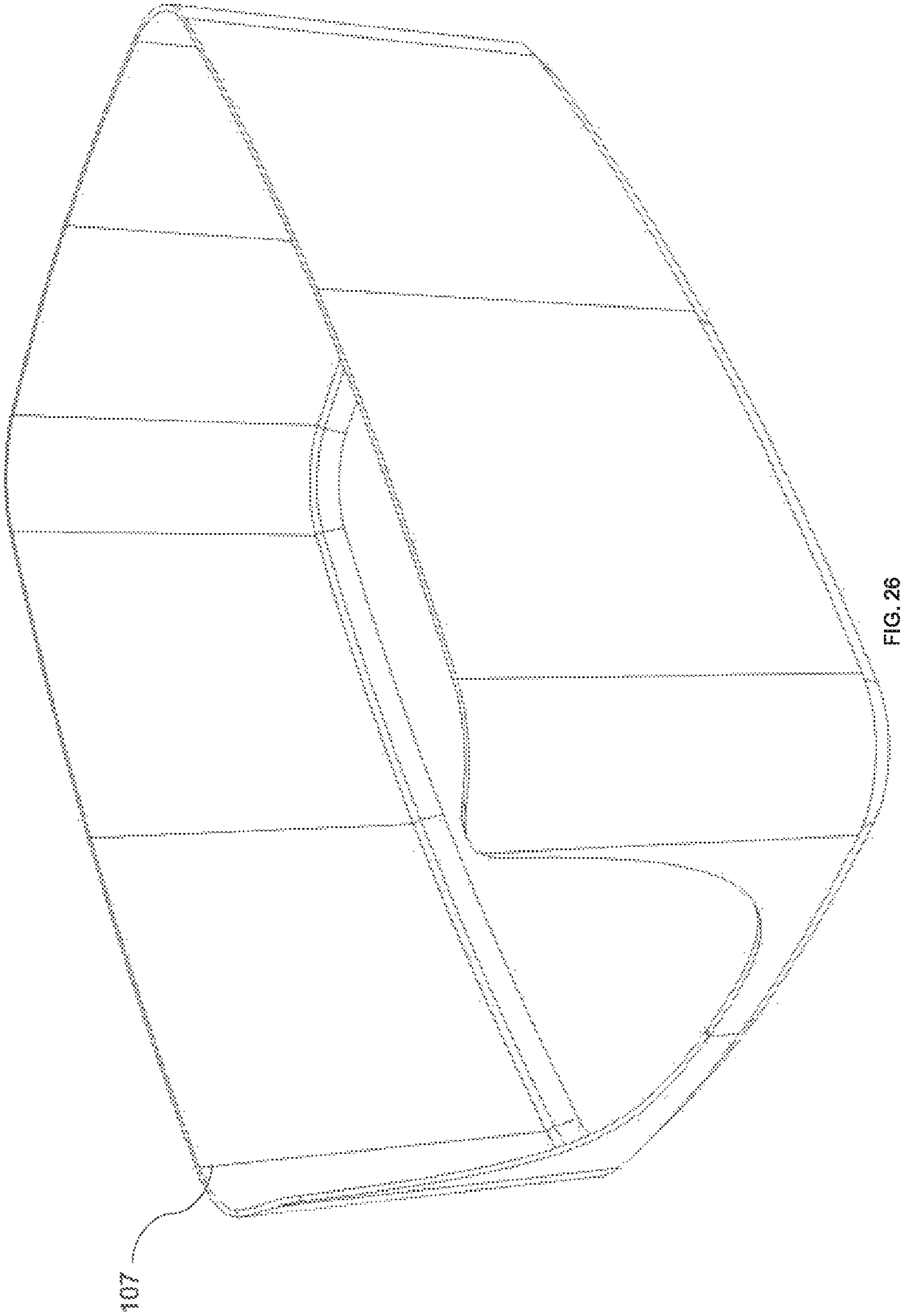
FIG. 26 is an outer layer of the improved litter box according to an embodiment of the present invention.
Figure 27:
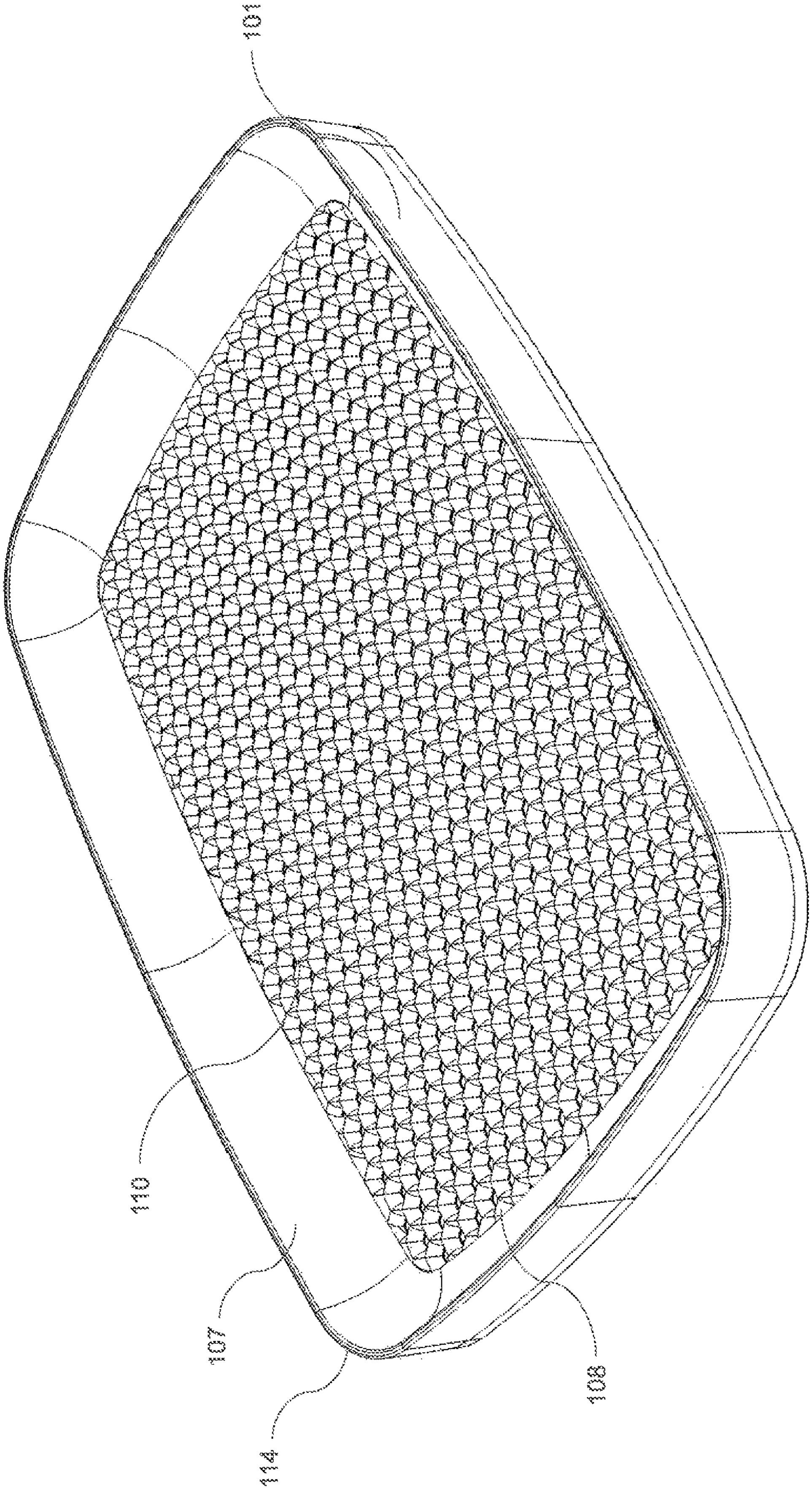
FIG. 27 is a segment housing member according to an embodiment of the present invention.
Figure 28:
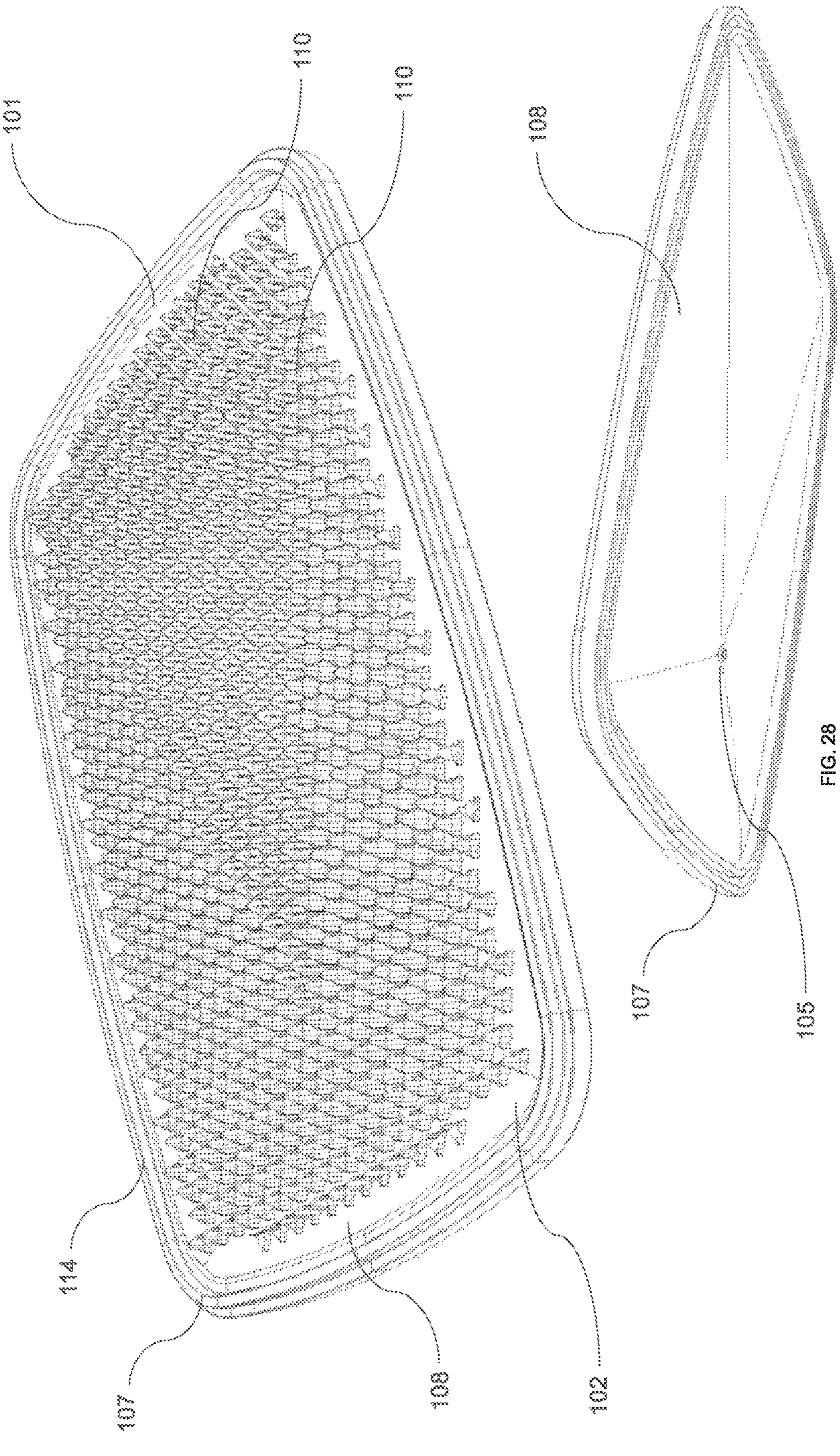
FIG. 28 is a segment housing member according to an embodiment of the present invention.
Figure 29:
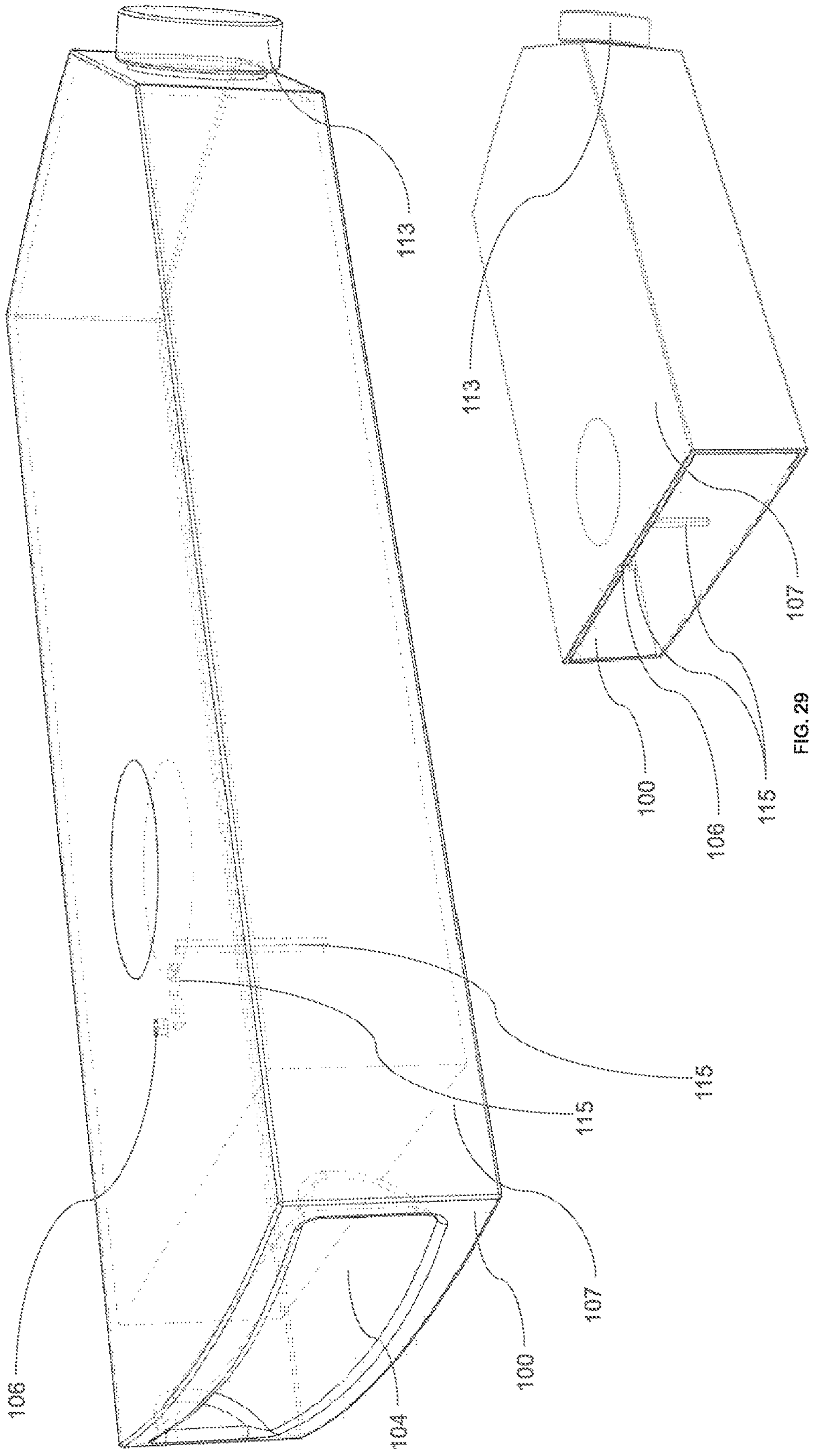
FIG. 29 is a perspective view of the base container according to an embodiment of the present invention.

Referring now to FIG. 18-30, various views of the improved litter box are illustrated. In some views, one can appreciate the overall system of components. and functionally operate similarly as the previously described embodiments. Best seen in FIGS. 21-23, in some embodiments, one or more urine sensors 115 may be provided. The sensors 115 are configured to be positioned in direct or proximal contact with urine that passes through or collected within the urine collection tank (base container 100). Advantageously, the sensors are configured to measure various physical and chemical properties of the urine, including but not limited to optical properties (e.g., color, turbidity), electrochemical properties (e.g., pH, glucose, electrolytes), conductivity, and similar properties. In some embodiments, the sensors may include, but are not limited to optical sensors, electrochemical sensors, and conductivity sensors.

Figure 30:
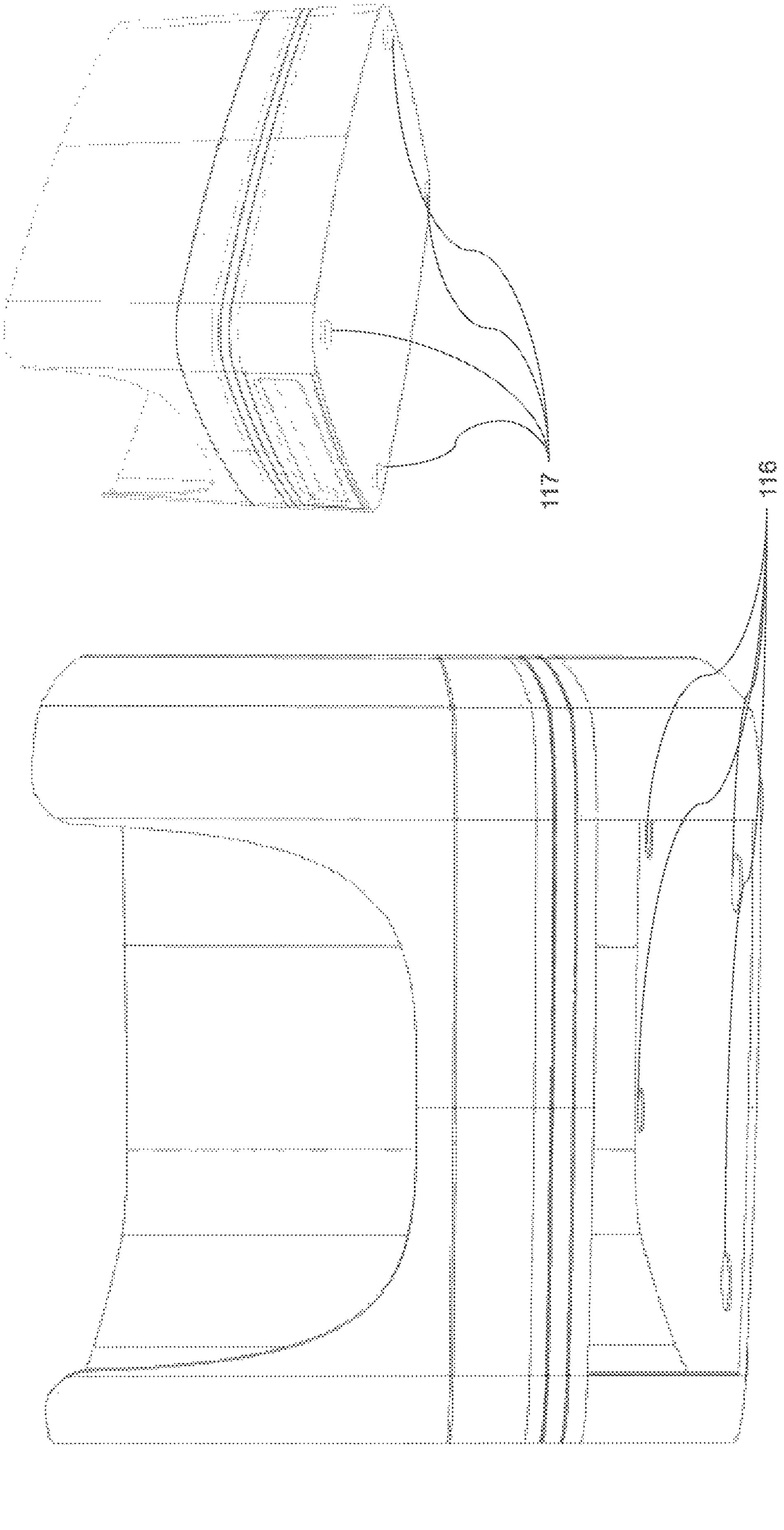
FIG. 30 is a perspective view of a bottom support layer according to an embodiment of the present invention.

In some embodiments, best seen in FIG. 30, one or more tank weight sensors 116 may be provided within the bottom support layer, wherein the tank weight sensors 116 are configured to be positioned beneath the urine collection tank to measure changes in mass and volume of the collected urine, employing technologies such as weight sensors or load cells.

In some embodiments, a number of box weight sensors are positioned beneath the litter box itself to measure changes in the overall mass of the litter box, including the cat and litter, utilizing technologies such as weight sensors or load cells, to track cat weight and changes in litter mass.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For instance, although a gravity liquid waste collection system has been described, a pressure or vacuum via air or liquid may be provided to facilitate the drainage of the liquid waste through the system.

Further although not illustrated, various filters, nets, or similar devices may be used throughout the invention to capture liquids, solids, etc. while preventing odors. It should be understood that the number of components, or orientation of the components may vary. Further other components may be used to increase the strength of the overall system, and various materials may be used factoring in strength, manufacturing cost, etc.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An improved litter box comprising:

a hollow base container configured to retain liquid waste;

a sloped transportation member positioned on top of the base container, wherein the sloped transportation member is configured to direct liquid waste to the hollow base container, wherein the sloped transportation member comprises a plurality of segment members protruding vertically;

a segment housing member positioned on top of the sloped transportation member, wherein the segment housing member comprises a plurality of sloped material sections, each sloped material section configured to laterally surround at least a portion of a segment member of the plurality of segment members creating a space defining a continuous perimeter drainage gap between each sloped material section and the corresponding segment member, wherein the continuous perimeter drainage gap is configured to allow liquid waste to pass through the segment housing member and enter the sloped transportation member, wherein the sloped material sections are sloped downwardly towards the continuous perimeter drainage gap; and, a plurality of litter sand particles positioned and retained above the continuous perimeter drainage gap.

2. The improved litter box of claim 1, wherein the hollow base container comprises a handle enabling a user to maneuver the hollow base container for maintenance and draining of the liquid waste contained in the hollow base container.

3. The improved litter box of claim 1, further comprising one or more supports positioned on the segment housing member or the transportation member, wherein the supports are configured to retain an additional layer positioned above the segment housing member.

4. The improved litter box of claim 3, wherein the one or more supports comprise tabs, flanges, or surface contours configured to physically retain the additional layer in a fixed position.

5. The improved litter box of claim 1, further comprising at least one urine sensor positioned within or proximate to the hollow base container, the urine sensor configured to detect one or more chemical or physical properties of the urine.

6. The improved litter box of claim 5, wherein the urine sensor is selected from the group consisting of optical sensors, electrochemical sensors, and conductivity sensors.

7. The improved litter box of claim 5, wherein the urine sensor is configured to detect pH, glucose, turbidity, electrolyte content, or other data of the urine.

8. The improved litter box of claim 1, further comprising at least one tank weight sensor positioned beneath the hollow base container, the tank weight sensor configured to detect changes in weight of the container corresponding to liquid waste accumulation.

9. The improved litter box of claim 1, further comprising one or more box weight sensors configured to detect the total weight of the litter box and to infer a weight of a cat using the litter box.

10. An improved litter box comprising:

a hollow base container configured to retain liquid waste;

a sloped transportation member positioned on top of the hollow base container and configured to direct liquid waste to the hollow base container;

a plurality of segment members protruding upwardly relative to the sloped transportation member;

a segment housing member positioned on top of the sloped transportation member, the segment housing member comprising a plurality of sloped material sections, each sloped material section being positioned around at least a portion of a corresponding segment member of the plurality of segment members and being spaced apart from the corresponding segment member to define a drainage space between the sloped material section and the corresponding segment member, wherein the drainage space extends around the corresponding segment member in a horizontal plane, wherein the sloped material section slopes downwardly toward the drainage space such that liquid waste is directed through the drainage space and onto the sloped transportation member, and wherein the drainage space is smaller than litter particles positioned above the drainage space; and a plurality of litter particles positioned above the drainage spaces.

* * * * *